United States Patent
Abe et al.

[11] Patent Number: 5,805,314
[45] Date of Patent: Sep. 8, 1998

[54] COLOR IMAGE FORMING APPARATUS SEPARATELY CORRECTING EACH COLOR COMPONENT IMAGE

[75] Inventors: Shunichi Abe, Yokohama; Mitsuo Hasebe, Tokyo, both of Japan

[73] Assignee: Ricoh Company, Ltd., Tokyo, Japan

[21] Appl. No.: 746,995

[22] Filed: Nov. 19, 1996

Related U.S. Application Data

[63] Continuation of Ser. No. 504,826, Jul. 20, 1995, abandoned.

[30] Foreign Application Priority Data

| Jul. 22, 1994 | [JP] | Japan | 6-170745 |
| Nov. 14, 1994 | [JP] | Japan | 6-278704 |
| May 17, 1995 | [JP] | Japan | 7-118106 |

[51] Int. Cl.$^6$ .............. H04N 1/21; H04N 1/46; G03F 3/08
[52] U.S. Cl. .......... 358/518; 358/298; 358/296; 358/501; 358/503; 395/109
[58] Field of Search .............. 358/501, 503, 358/504, 509, 514, 515, 517, 518, 296, 298; 395/109

[56] References Cited

U.S. PATENT DOCUMENTS

| 4,665,435 | 5/1987 | Miura | 358/520 |
| 4,845,549 | 7/1989 | Someya | 358/503 |
| 4,941,038 | 7/1990 | Walowit | 358/504 |
| 4,956,703 | 9/1990 | Uzuda et al. | 358/504 |
| 5,132,788 | 7/1992 | Hirota | 358/518 |
| 5,191,361 | 3/1993 | Abe | 358/518 |
| 5,250,959 | 10/1993 | Yamada et al. | 358/298 |
| 5,309,256 | 5/1994 | Takada et al. | 358/518 |
| 5,491,568 | 2/1996 | Wan | 358/504 |
| 5,598,272 | 1/1997 | Fisch et al. | 358/504 |
| 5,636,330 | 6/1997 | Barak | 358/504 |

*Primary Examiner*—Kim Yen Vu
*Assistant Examiner*—Kimberly A. Williams
*Attorney, Agent, or Firm*—Oblon, Spivak, McClelland, Maier & Neustadt, P.C.

[57] ABSTRACT

A color image forming apparatus separately corrects an intensity of each of color component images used for forming a multicolor image. The multicolor image is formed by superimposing a plurality of color component images on a printing paper. Each of the color component images is formed by one of color toners. Color patterns having a gradation are printed by using each of the color toners. A color sensor is provided at a position in which each of the color patterns is read, the color sensor being sensitive to a color of each of the color toners. The color sensor outputs output signals corresponding to each of the color patterns. The intensity of each of the color component images is corrected in accordance with the corresponding output signals of the color sensor. A mixture of colors in each of the color component images is detected, and the intensity of the corresponding color component image is corrected so as to maintain a desired color balance.

37 Claims, 19 Drawing Sheets

FIG.15

| MOST SIGNIFICANT BIT POSITIONS (3-BIT) | LEAST SIGNIFICANT BIT POSITIONS (3-BIT) | OUTPUT DATA (8-BIT) |
|---|---|---|
| 0 | 00 | 00 |
| 0 | 01 | 01 |
| 0 | 02 | 02 |
| 0 | 03 | 03 |
| 0 | 04 | 04 |
| 0 | 05 | 05 |
| 0 | 06 | 06 |
| 0 | 07 | 07 |
| 0 | 08 | 08 |
| 0 | 09 | 09 |
| 0 | 0A | 0A |
| 0 | 0B | 0B |
| 0 | · | · |
| 0 | · | · |
| 0 | · | · |
| 0 | FA | FA |
| 0 | FB | FB |
| 0 | FC | FC |
| 0 | FD | FD |
| 0 | FE | FE |
| 0 | FF | FF |

| MOST SIGNIFICANT BIT POSITIONS (3-BIT) | LEAST SIGNIFICANT BIT POSITIONS (3-BIT) | OUTPUT DATA (8-BIT) |
|---|---|---|
| 1 | 00 | 00 |
| 1 | 01 | 00 |
| 1 | 02 | 01 |
| 1 | 03 | 02 |
| 1 | 04 | 03 |
| 1 | 05 | 04 |
| 1 | 06 | 05 |
| 1 | 07 | 06 |
| 1 | 08 | 07 |
| 1 | 09 | 08 |
| 1 | 0A | 09 |
| 1 | 0B | 0A |
| 1 | · | 0B |
| 1 | · | · |
| 1 | · | · |
| 1 | · | · |
| 1 | FA | · |
| 1 | FB | FA |
| 1 | FC | FB |
| 1 | FD | FC |
| 1 | FE | FD |
| 1 | FF | FE |

| MOST SIGNIFICANT BIT POSITIONS (3-BIT) | LEAST SIGNIFICANT BIT POSITIONS (3-BIT) | OUTPUT DATA (8-BIT) |
|---|---|---|
| 2 | 00 | 00 |
| 2 | 01 | 00 |
| 2 | 02 | 00 |
| 2 | 03 | 01 |
| 2 | 04 | 02 |
| 2 | 05 | 03 |
| 2 | 06 | 04 |
| 2 | 07 | 05 |
| 2 | 08 | 06 |
| 2 | 09 | 07 |
| 2 | 0A | 08 |
| 2 | 0B | 09 |
| 2 | · | 0A |
| 2 | · | 0B |
| 2 | · | · |
| 2 | · | · |
| 2 | · | · |
| 2 | FA | · |
| 2 | FB | · |
| 2 | FC | FA |
| 2 | FD | FB |
| 2 | FE | FC |
| 2 | FF | FD |

| MOST SIGNIFICANT BIT POSITIONS (3-BIT) | LEAST SIGNIFICANT BIT POSITIONS (3-BIT) | OUTPUT DATA (8-BIT) |
|---|---|---|
| 3 | 00 | 00 |
| 3 | 01 | 00 |
| 3 | 02 | 00 |
| 3 | 03 | 00 |
| 3 | 04 | 01 |
| 3 | 05 | 02 |
| 3 | 06 | 03 |
| 3 | 07 | 04 |
| 3 | 08 | 05 |
| 3 | 09 | 06 |
| 3 | 0A | 07 |
| 3 | 0B | 08 |
| 3 | · | 09 |
| 3 | · | 0A |
| 3 | · | 0B |
| 3 | · | · |
| 3 | FA | · |
| 3 | FB | · |
| 3 | FC | · |
| 3 | FD | FA |
| 3 | FE | FB |
| 3 | FF | FC |

↙ 211

COLOR IMAGE FORMING APPARATUS SEPARATELY CORRECTING EACH COLOR COMPONENT IMAGE

This application is a Continuation of application Ser. No. 08/504,826, filed on Jul. 20, 1995, now abandoned.

BACKGROUND OF THE INVENTION

1) Field of the Invention

The present invention relates to color image forming apparatuses and, more particularly, to a color image forming apparatus forming a multicolor image by superimposing a plurality of color component images formed by different color developing agents such as color toner or color ink.

2) Description of the Related Art

A color printer is known which forms a multi-color image by transferring color component images formed by yellow toner, magenta toner and cyan toner, in turn, onto a printing sheet by using an electrophotographic method.

In such a color printer, an intensity of a color component image corresponding to a particular color toner may be reduced or an intensity gradation of a particular color component image may be deteriorated due to aging of color toner or a photosensitive drum. In such a case, color balance in the color component image is deteriorated, resulting in deterioration of printing quality.

In order to eliminate the above-mentioned problem, a conventional digital color copy machine corrects intensity of each color component image by using a color sensor for sensing an intensity of a test pattern corresponding to each color toner image. For example, a test pattern having an intensity gradation is prepared for yellow toner, magenta toner, cyan toner and black toner. The test pattern for each color is irradiated, in turn, by an infrared beam and the reflected beam is sensed by a photosensor. The correction is performed based on signals output from the photosensor. Japanese Laid-Open Patent Applications No.59-163968 and No.60-189362 disclose the above-mentioned correcting method used for a color copy machine. In this method, a test pattern is irradiated by a photodiode, and the reflected beam is sensed by a photosensor.

Since each color toner hardly absorbs an infrared beam and single color beams other than a complementary color beam, it is difficult to sense change in the intensity of the test patterns, which change is represented by a change in an intensity of the beam reflected by each color image pattern, by irradiating the test patterns with an infrared beam or a single color beam other than a complementary color beam.

Additionally, in the above-mentioned color printer, color image quality may be deteriorated due to the mixing of different color toners. The color printer has a plurality of developing devices, each storing a different color toner. Since the color toners are sequentially transferred onto a recording sheet or a transfer belt one after another, the preceding color toner may enter into the developing device which stores the next color toner. When this condition occurs, two different color toners are mixed in a single developing device, resulting in deterioration in color balance of the color image formed by the color printer.

SUMMARY OF THE INVENTION

It is a general object of the present invention to provide an improved and useful color image forming apparatus in which the above-mentioned problems are eliminated.

A more specific object of the present invention is to provide a color image forming apparatus which separately corrects an intensity of each color component image used for forming a multi-color image.

Another object of the present invention is to provide a color image forming apparatus which corrects a mixture of colors in a color component image so as to maintain a desired color balance.

In order to achieve the above-mentioned objects, there is provided according to the present invention a color image forming apparatus forming a multicolor image by superimposing a plurality of color component images on a printing paper, each of the color component images being formed by one of predetermined color developing agents, the color image forming apparatus comprising:

pattern printing means for printing color patterns having an intensity gradation by using each of the predetermined color developing agents, the color patterns being printed on one of the printing paper and a carrier conveying the printing paper;

a color sensor provided at a position in which each of the color patterns is read, the color sensor being sensitive to a color of each of the predetermined color developing agents;

reading means for reading output signals of the color sensor corresponding to each of the color patterns; and intensity correcting means for separately correcting an intensity of each of the color component images in accordance with the corresponding output signals of the color sensor.

Additionally, the color image forming apparatus according to the present invention further comprises: color mixture detecting means for detecting a mixture of colors in each of the color component images by using said color patterns; and color mixture correcting means for correcting the intensity of one of the color component images when the mixture of colors is detected so that a color balance of the multicolor image is maintained at a desired condition.

Other objects, features and advantages of the present invention will become more apparent from the following detailed description when read in conjunction with the accompanying drawings.

BRIEF DESCRIPTION OF THE DRAWINGS

FIG. 15 is an illustration of a look-up table;

FIG. 16 is an illustration of a look-up table;

FIG. 17 is an illustration of a look-up table;

FIG. 18 is an illustration of a look-up table; and

DETAILED DESCRIPTION OF THE PREFERRED EMBODIMENTS

Figure 1:
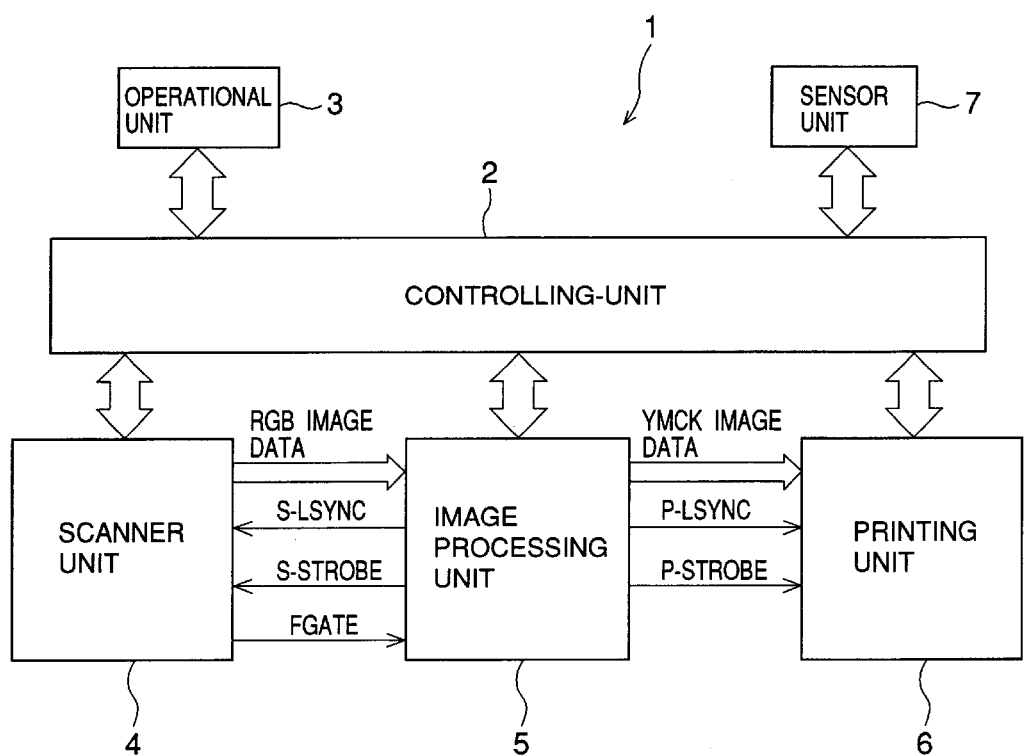
FIG. 1 is a block diagram of a first embodiment of a color image forming apparatus according to the present invention.

A description will now be given of a first embodiment of a color copy machine 1 as a color printer according to the present invention. FIG. 1 is a block diagram of the color copy machine 1.

The color copy machine 1 comprises a controlling unit 2, an operational unit 3, a scanner unit 4, an image processing unit 5, a printing unit 6 and a sensor unit 7. The operational unit 3, the scanner unit 4, the image processing unit 5, the printing unit 6 and the sensor unit 7 are separately connected to the controlling unit 2. The scanner unit 4 and the printing unit 6 are directly connected to the image processing unit 5.

Figure 2:
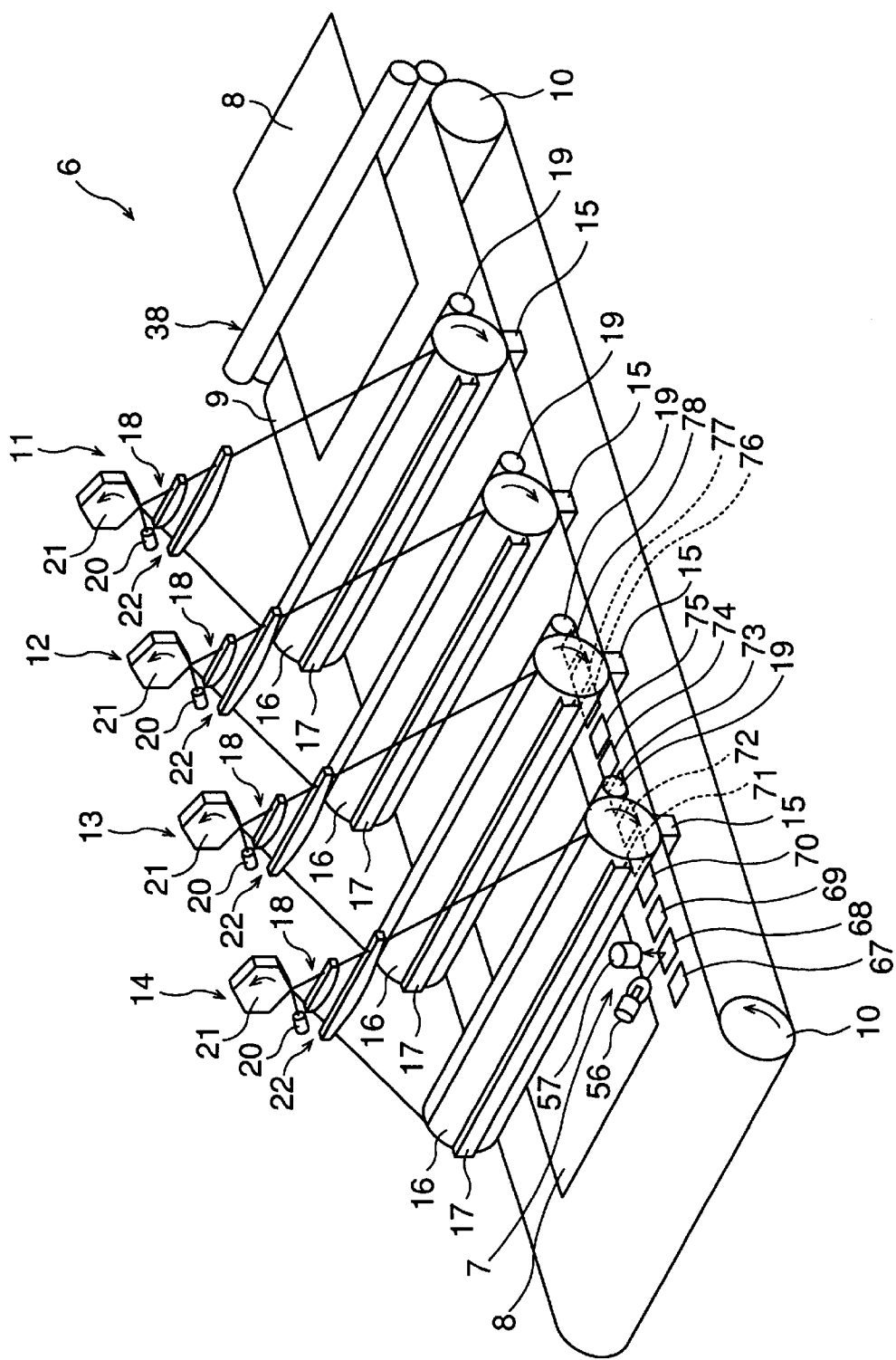
FIG. 2 is a perspective view of a printing unit shown in FIG. 1.

As shown in FIG. 2, the printing unit 6 includes a transfer belt 9 which transfers a printing sheet 8 onto which a multicolor image is formed. The transfer belt 9 is an endless belt colored in white which is an achromatic color. The transfer belt 9 is supported by a pair of guide rollers 10 so that the transfer belt 9 moves around and between the guide rollers 10. First to fourth printing stations 11 to 14 are arranged along a straight portion of the transfer belt 9. Each of the printing stations 11 to 14 comprises a photosensitive drum 16, a static charger 17, a laser scanner 18, and a developer 19. A transfer charger 15 is positioned opposite to the photosensitive drum 16 with the transfer belt 9 therebetween. The laser scanner 18 comprises a laser source 20, a polygon mirror 21 and an optical path correcting system 22. The optical path correcting system 22 is positioned between the polygon mirror 21 and the photosensitive drum 16. The developers 19 of the printing stations 11 to 14 contain yellow toner, magenta toner, cyan toner and black toner, as color component toners, respectively.

Figure 3:
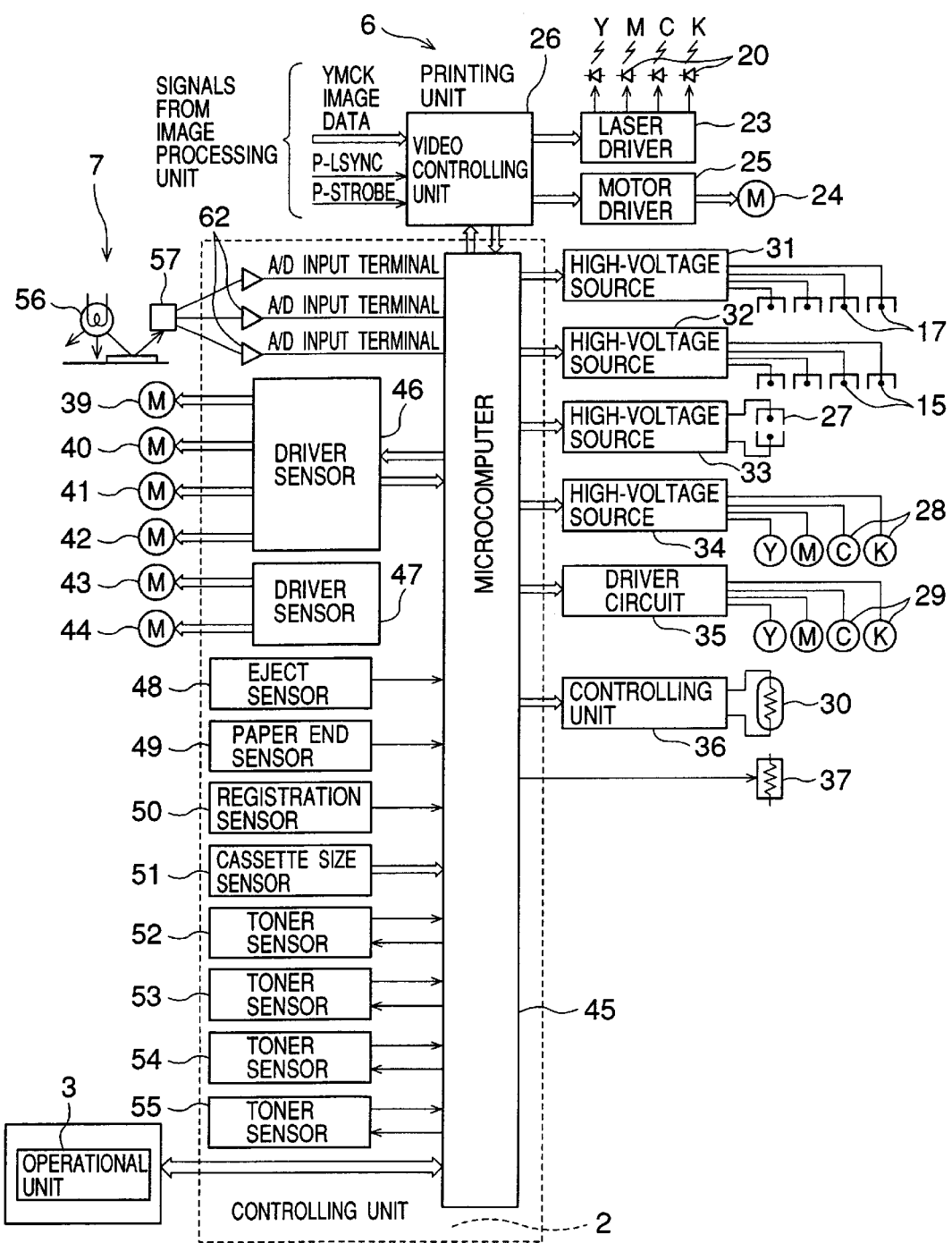
FIG. 3 is a block diagram of the printing unit shown in FIG. 1.

FIG. 3 is a block diagram of the printer 6. The printer 6 has a video controlling unit 26 which controls a laser driver 23 and a motor driver 25. The laser driver 23 is connected to the laser source 20 of each of the printing stations 11 to 14. The motor driver 25 is connected to a driving motor 24 which drives the polygon mirror 21 of each of the printing stations 11 to 14. The static charger 17 of each of the printing stations 11 to 14 is connected to a high-voltage source 31. The transfer charger 15 of each of the printing stations 11 to 14 is connected to a high-voltage source 32. A belt charger 27 which discharges the transfer belt 9 is connected to a high-voltage source 33. A developing charger 28 of each of the printing stations 11 to 14 is connected to a high-voltage source 34. The developing charger 28 charges the toner stored in the developer 19. A toner supplier 29 is connected to a driver circuit 35. A heater 30 of a fixing device (not shown in the figure) is connected to a controlling unit 36. A thermistor 37 is provided in the fixing device.

Motors 39 to 42, which are direct-current motors, are connected to a microcomputer 45 via a driver circuit 46. The motor 39 drives the photosensitive drum 16. The motor 40 drives the transfer belt 9. The motor 41 drives the developer 19. The motor 42 drives the fixing device. Additionally, motors 43 and 44, which are pulse motors, are connected to a driver circuit 47 of the controlling unit 2. The motor 43 drives a paper feeder 38 shown in FIG. 2. The motor 44 drives a registration roller (not shown in the figure). The video controlling unit 26, the high-voltage sources 31 to 34, the driver circuit 35, the controlling unit 36 and the thermistor 37 are also connected to the microcomputer 45.

The controlling unit 2 further comprises various sensors such as an eject sensor 48, a paper-end sensor 49, a registration sensor 50, a cassette-size sensor 51 and toner sensors 52 to 55. These sensors are also connected to the microcomputer 45. The eject sensor 48 detects an ejection of the printing paper 8 outside the printer. The paper-end sensor 49 detects a presence of the printing paper 8 in a paper supply cassette (not shown in the figure). The registration sensor 50 detects feeding of the printing paper 8 to the registration roller. The toner sensors 52 to 55 detect presence of color toner in the respective developers 19.

The microcomputer 45 comprises a central processing unit, a random access memory, a read-only memory and an interface so as to perform various controls in accordance with programs installed therein.

Figure 4:
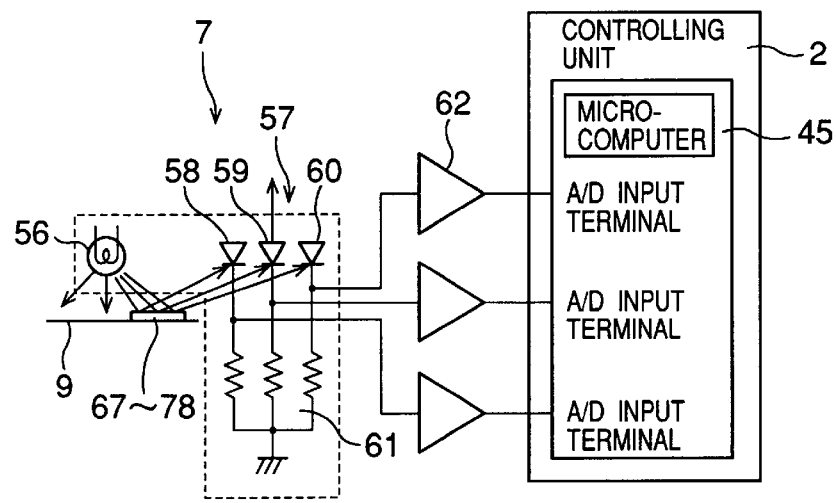
FIG. 4 is a circuit diagram of a sensor unit shown in FIG. 1.

As shown in FIG. 2, a white light source 56 and a color sensor 57 are arranged adjacent to the transfer belt 9. The white light source 56 and the color sensor 57 are positioned near a guide roller 10 and near a side of the transfer belt 9. The color sensor 57 comprises first to third light-receiving elements 58, 59 and 60 as shown in FIG. 4. The first light-receiving element 58 is sensitive to a blue light. The second light-receiving element 59 is sensitive to a green light. The third light-receiving element 60 is sensitive to a red light. Accordingly the color sensor 57 has a spectral characteristic corresponding to each color toner. Additionally, each of the light-receiving elements 58 to 60 is connected to a resistor 61 which converts a current signal output from the light-receiving elements 58 to 60 into a voltage signal. The voltage signal is supplied to the microcomputer 45 of the controlling unit 2 via an amplifier 62.

Each of the light-receiving elements 58 to 60 comprises a regular photodiode having no spectral characteristic and a color filter transmitting only a predetermined color light. The white light source 56 is a regular illumination lamp which radiates light having a wavelength ranging from 400 to 700 nm.

Figure 5:
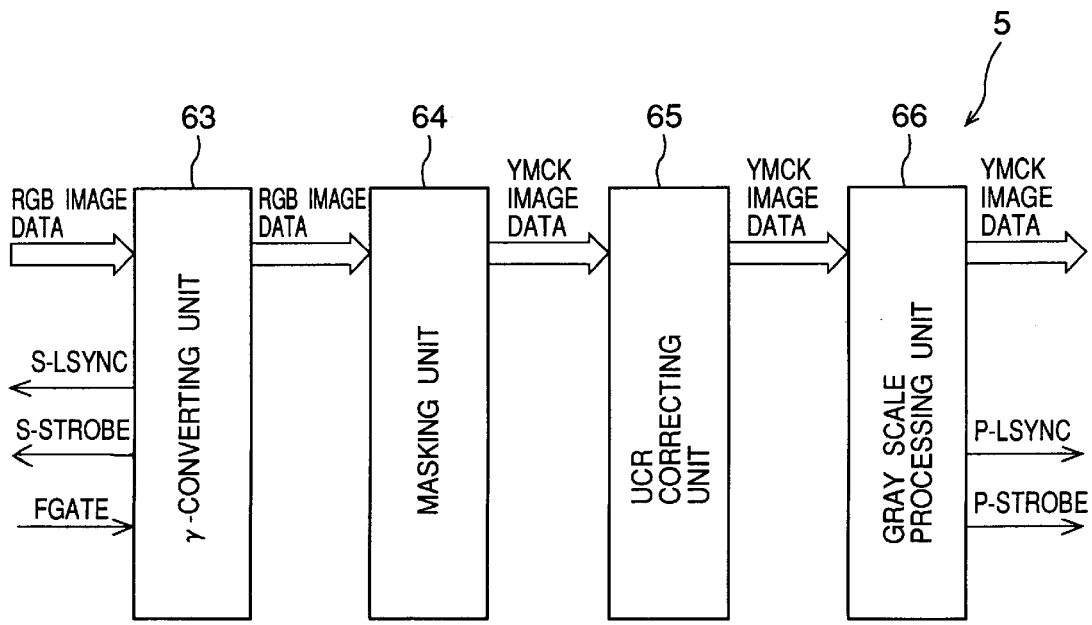
FIG. 5 is a block diagram of an image processing unit shown in FIG. 1.

FIG. 5 is a block diagram of the image processing unit 5 shown in FIG. 1. The image processing unit 5 comprises a τ-converting unit 63, a masking unit 64, a UCR processing unit 65, a gray scale processing unit 66 and a buffer memory (not shown in the figure), connected in that order. The scanner unit 4 is connected to the τ-converting unit 63. The gray scale processing unit 66 is connected to the printing unit 6.

The operational unit 3 shown in FIG. 1 comprises a keyboard (not shown in the figure) via which various commands and instructions are input and a display (not shown in the figure) which displays various guidances and data.

In the above-mentioned color copy machine 1, patch patterns 67 to 78 are formed on the transfer belt 9 as shown in FIG. 2. The patch patterns 67 to 78 are formed by the printing unit 6 in accordance with predetermined image pattern information read out by the controlling unit 2 from a memory having a backup power source. The printing unit 6 and the controlling unit 2 together constitute pattern printing means. More specifically, the pattern printing means prints the patch patterns 67 to 69 which are formed by yellow toner, the patch patterns 70 to 72 which are formed by magenta toner, the patch patterns 73 to 75 which are formed by cyan toner, and the patch patterns 76 to 78 which are formed by black toner. The patch patterns 67 to 78 serve as test patterns as will be described later.

The color copy machine 1 further comprises reading means and intensity correcting means. The reading means reads the output signal of the color sensor 57 in synchronization with the movement of the patch patterns 67 to 78. The intensity correcting means separately corrects an intensity of color component images corresponding to the respective color toners in accordance with the output signal of the color sensor 57.

More specifically, a signal output from the first light-receiving element 58, which is sensitive to a blue light, is read as the signal of the color sensor 57 when the patch patterns 67 to 69 move to a sensing area of the color sensor 57. Similarly, a signal output from the second light-receiving element 59, which is sensitive to a green light, is read as the signal of the color sensor 57 when the patch patterns 70 to 72 move to the sensing area of the color sensor 57. A signal output from the third light-receiving element 60, which is sensitive to a red light, is read as the signal of the color sensor 57 when the patch patterns 73 to 75 move to the sensing area of the color sensor 57. A signal output from the first light-receiving element 58 is read as the signal of the color sensor 57 when the patch patterns 76 to 78 move to the sensing area of the color sensor 57. The reading operation for the patch patterns is controlled by the microcomputer 45.

The color copy machine 1 scans a color image original to obtain 8-bit RGB (red, green blue) image data. The RGB image data is then converted into 1-bit YMCK (yellow, magenta, cyan, black) image data. The printing unit 6 then prints a color image on the printing paper 8 by using an electrophotographic method. The scanner unit 4, the image processing unit 5 and the printing unit 6 are controlled by the controlling unit 2 in accordance with data and instructions input via the operational unit 3.

More specifically, when a color image is copied to the printing paper 8, the scanner 4 scans the original and outputs RGB image data to the image processing unit 5. At this time, the image processing unit 5 supplies to the scanner unit 4 a line synchronization signal S-LSYNC, an image clock signal S-STROBE and a frame synchronization signal FGATE. The scanner unit 4 outputs the RGB image data to the image processing unit 5 in synchronization with those signals.

The image processing unit 5 converts the RGB image data into the YMCK image data and outputs the YMCK image data to the printing unit 6 together with a line synchronization signal P-LSYNC and an image clock signal P-STROBE. At this time, since the YMCK image data is output at a predetermined interval which corresponds to the interval between adjacent printing stations 11 to 14, the image processing unit 5 temporarily stores the YMCK image data in the buffer memory.

The printing unit 6 drives the laser source 20 of each of the printing stations 11 to 14 so as to form an electrostatic latent image onto the photosensitive drum 16 of each of the printing stations 11 to 14. The printing station 11 develops the latent image with yellow toner. The printing station 12 develops the latent image with magenta toner. The printing station 13 develops the latent image with cyan toner. The printing station 14 develops the latent image with black toner. Each toner image is transferred, in turn, to the printing paper on the transfer belt by means of a voltage applied by the respective transfer chargers 15. Accordingly, the color component images developed by the yellow toner, magenta toner, cyan toner and black toner are printed in a superimposed relationship so that a multicolor image is formed on the printing paper 8. The toner images are fixed by a heat press by the fixing device and the printing paper 8 is then ejected to outside the color copy machine 1.

In the color copy machine 1, an intensity and a gradation of a particular color toner image may be deteriorated due to aging of the corresponding color toner and photosensitive drum 16. In order to eliminate such a problem, the color copy machine 1 has a function to correct an intensity of each color toner image. The correction may be performed when a copying operation is started or ended or when a maintenance is carried out. The correction may be performed periodically. When the correction is performed, a set of the test patterns (the patch patterns) is formed on the transfer belt 9 as shown in FIG. 2, and then the test patterns are read by the color sensor 57.

More specifically, when the test patterns are formed, image data for the test patterns is read out from the memory of the controlling unit 2. The printing stations 11 to 14 form the patch patterns 67 to 78, in turn, by the respective color toners on the transfer belt 9. Three patch patterns, one for a low intensity, one for a medium intensity, and one for a high intensity, are provided for each color toner. For example, the patch pattern 67 corresponds to a high-intensity yellow pattern, the patch pattern 68 corresponds to a medium-intensity yellow pattern, and the patch pattern 69 corresponds to a low-intensity yellow pattern. Similarly, the patch pattern 70 corresponds to a high-intensity magenta pattern, the patch pattern 71 corresponds to a medium-intensity magenta pattern, and the patch pattern 72 corresponds to a low-intensity magenta pattern. The patch pattern 73 corresponds to a high-intensity cyan pattern, the patch pattern 74 corresponds to a medium-intensity cyan pattern, and the patch pattern 75 corresponds to a low-intensity cyan pattern. The patch pattern 76 corresponds to a high-intensity black pattern, the patch pattern 77 corresponds to a medium-intensity black pattern, and the patch pattern 78 corresponds to a low-intensity black pattern.

Figure 7A:
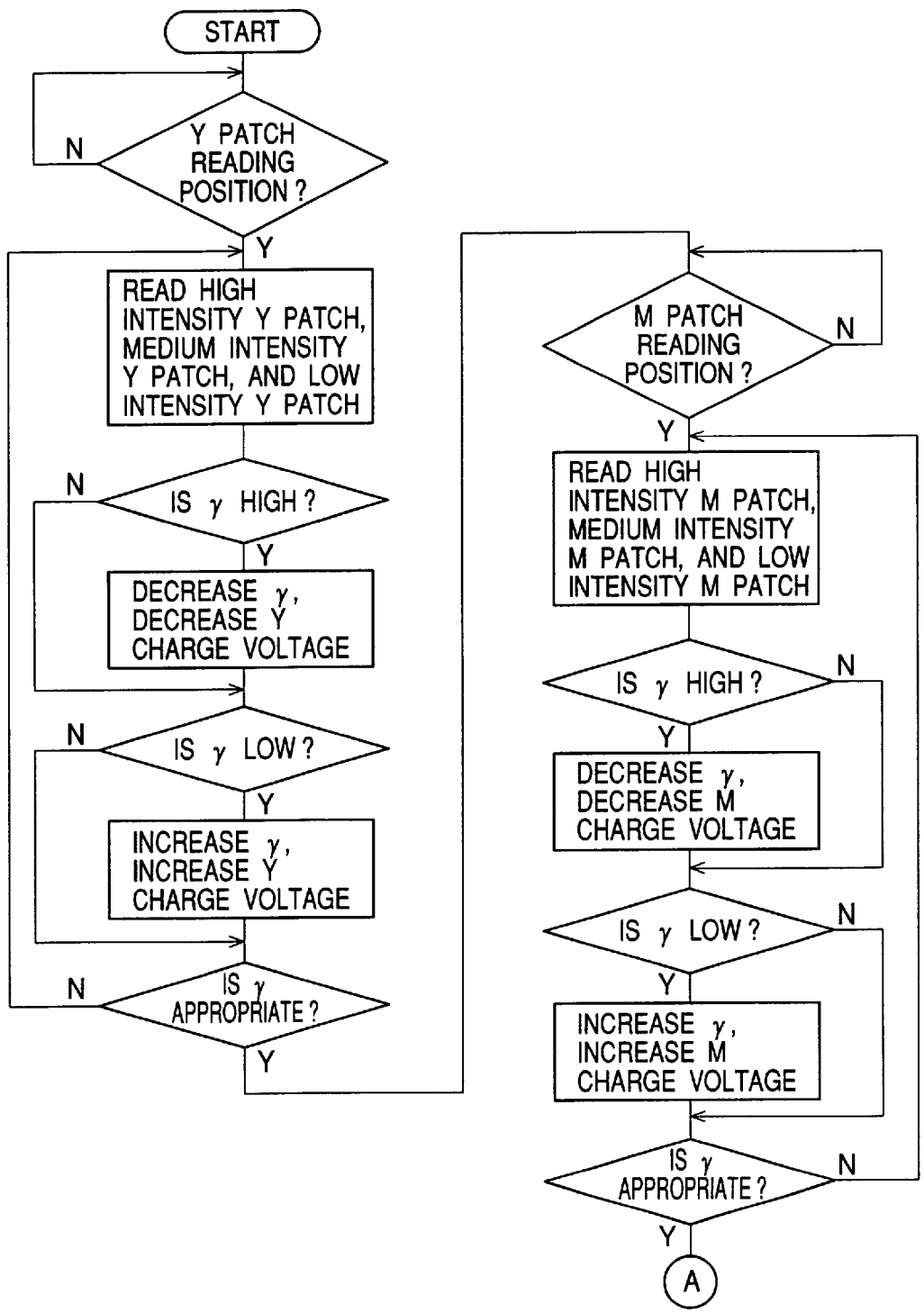
FIGS. 7A and 7B are parts of a flowchart for an operation to correct an intensity of each color image.
Figure 7B:
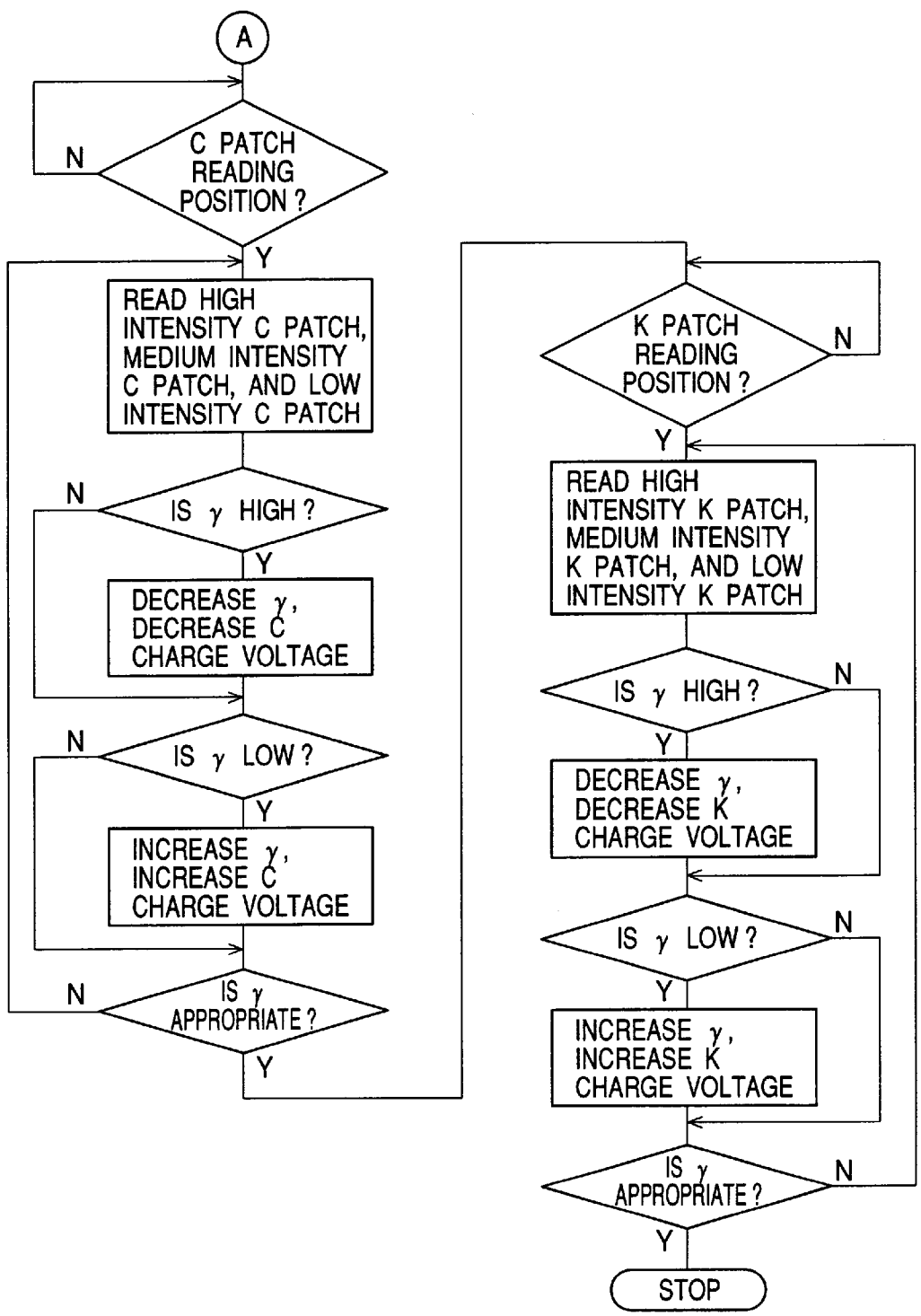

FIGS. 7A and 7B are parts of a flowchart for an operation to correct the intensity of each color image. The notation A of FIG. 7A connects to the notation A of FIG. 7B. In the operation shown in FIGS. 7A and 7B, the patch patterns 67 to 78 are read, in turn, by the color sensor 57 as the transfer belt 9 is moved. The yellow patches 67 to 69 are read by the first light-receiving element 58 which is sensitive to a blue light. The magenta patches 70 to 72 are read by the second light-receiving element 59 which is sensitive to a green light. The cyan patches 73 to 75 are read by the third light-receiving element 60 which is sensitive to a red light. The black patches 76 to 78 are read by the first light-receiving element 58 which is sensitive to a blue light.

In order to achieve the above-mentioned reading operation, the controlling unit 2 counts a reference clock signal which is synchronous with an operation of the driver circuit 46 driving the motor 40 of the transfer belt 9 so as to obtain a reading timing of each patch pattern 67 to 78. The reading operation is performed when the sensing area of the color sensor 57 corresponds to the center of each patch pattern. The reading operation for a set of patch patterns 67 to 78 is repeated for predetermined times to average the read values. Thus, effects of an electric noise and a print error can be eliminated.

In the above-mentioned reading operation, each color patch is read by one of the light-receiving elements 58 to 60 which is sensitive to a complementary color. Accordingly, an appropriate sensitivity is provided to the light-receiving elements 58 to 60. It should be noted that the black patches 75 to 78 can be appropriately read by any one of the first to third light-receiving elements 58 to 60 since black corresponds to a mixture of yellow, magenta and cyan.

Figure 6:
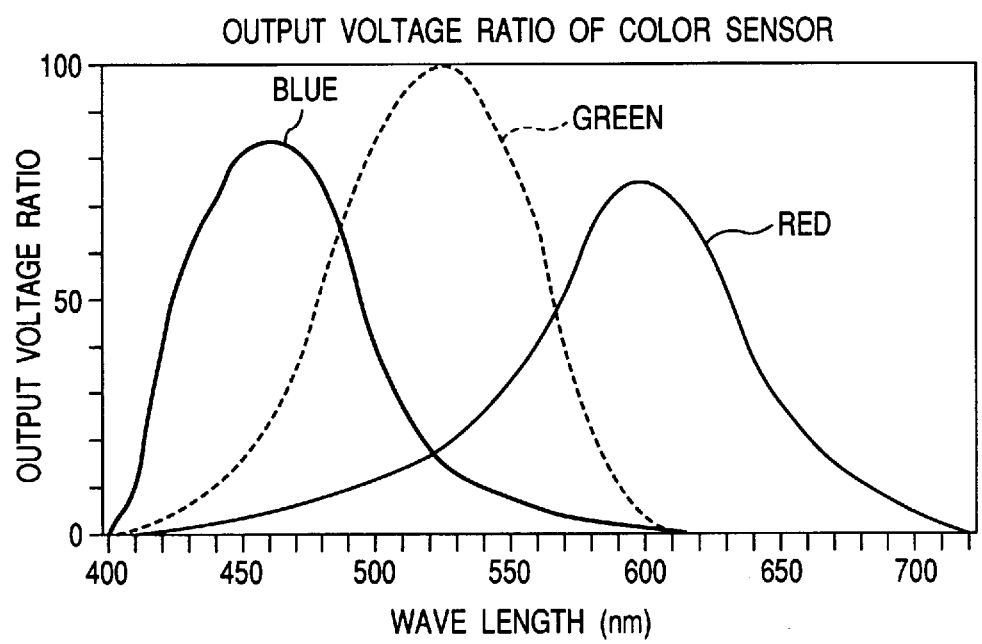
FIG. 6 is a graph showing an output voltage ratio of the sensor unit shown in FIG. 4.

Each of the light-receiving elements 58 to 60 receives a light having an intensity in inverse proportion to the intensity of the patch patterns 67 to 78 as shown in FIG. 6, and outputs a current in proportion to the intensity of the received light. The current output from the color sensor 57 is converted into a voltage, which is then amplified by the amplifier 62. The amplified voltage is supplied to corresponding analog-to-digital (A/D) input terminals of the microcomputer 45. The microcomputer 45 determines as a $\tau$ value a degree of change in the intensity of color toner image. The $\tau$ value is compared with a predetermined reference value. If the $\tau$ value is less than the predetermined reference value, a setting of the $\tau$-converting unit 63 (refer to FIG. 5) is changed so that a change in output data becomes greater than a change in the input data. Additionally, the output voltage of the static charger 17 is increased. On the other hand, if the $\tau$ value is greater than the predetermined reference value, the setting of the $\tau$-converting unit 63 is changed so that a change in output data becomes less than a change in the input data. Additionally, the output voltage of the static charger 17 is decreased.

Accordingly, the color copy machine 1 can maintain a color balance of each color component image by separately correcting an intensity change in each color toner image.

It should be noted that the patch patterns 67 to 78 may be formed on the printing paper 8 instead of forming them on the transfer belt 9. Additionally, patch patterns may be formed on the photosensitive drum 16 of each of the printing stations 11 to 14. In this case, the color sensor 57 and the light source 56 must be provided for each of the printing stations 11 to 14.

Figure 8:
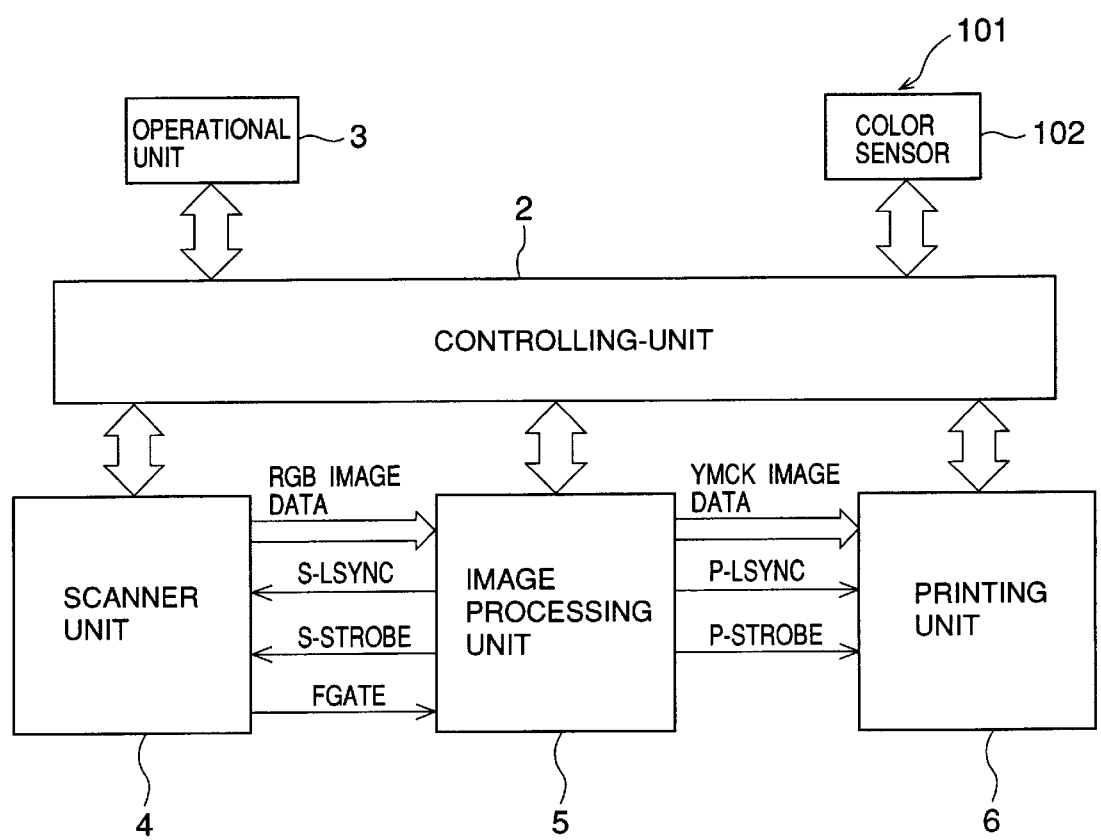
FIG. 8 is a block diagram of a color copy machine which is a second embodiment according to the present invention.
Figure 9:
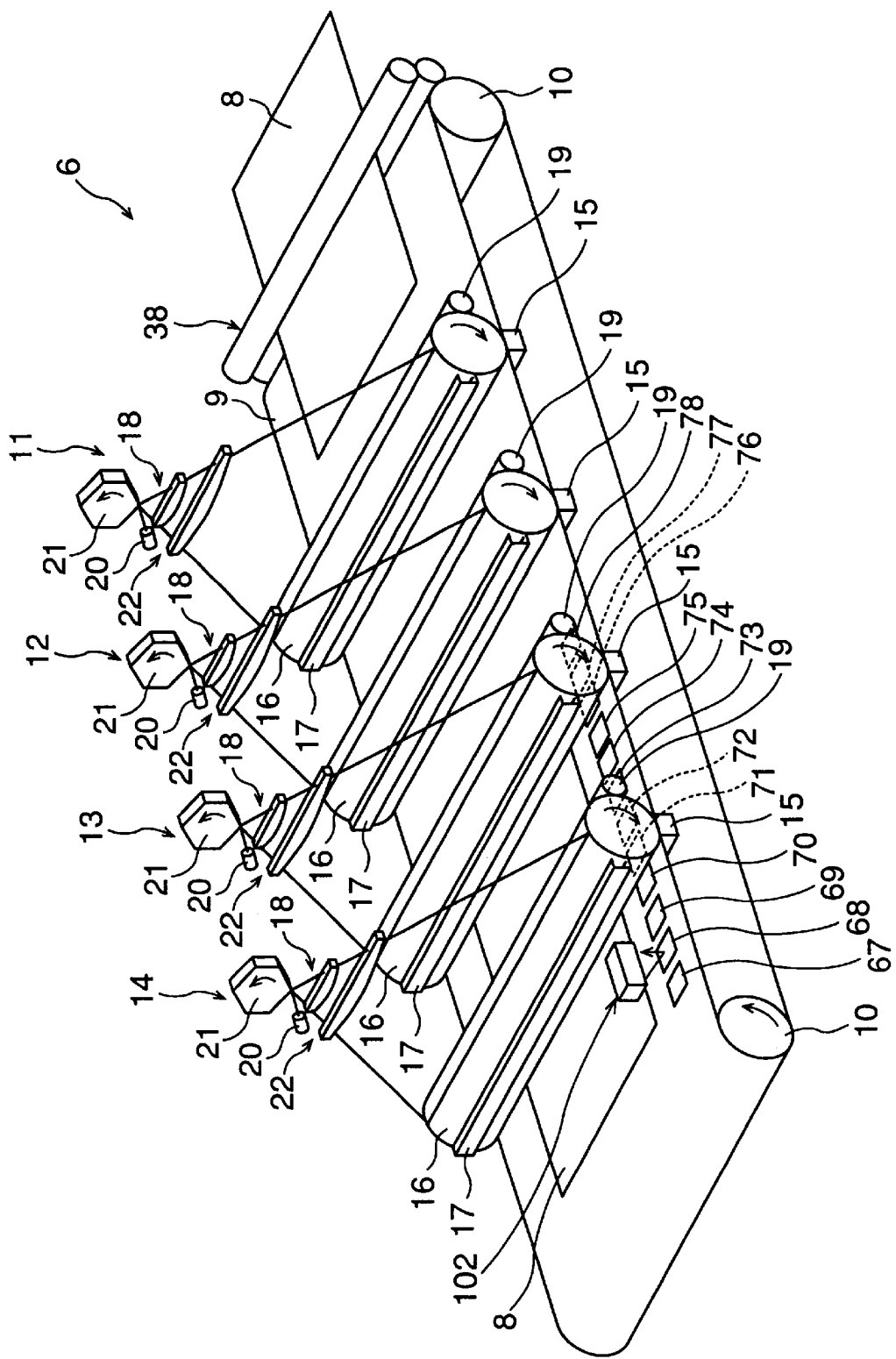
FIG. 9 is a perspective view of a printing unit shown in FIG. 8.
Figure 10:
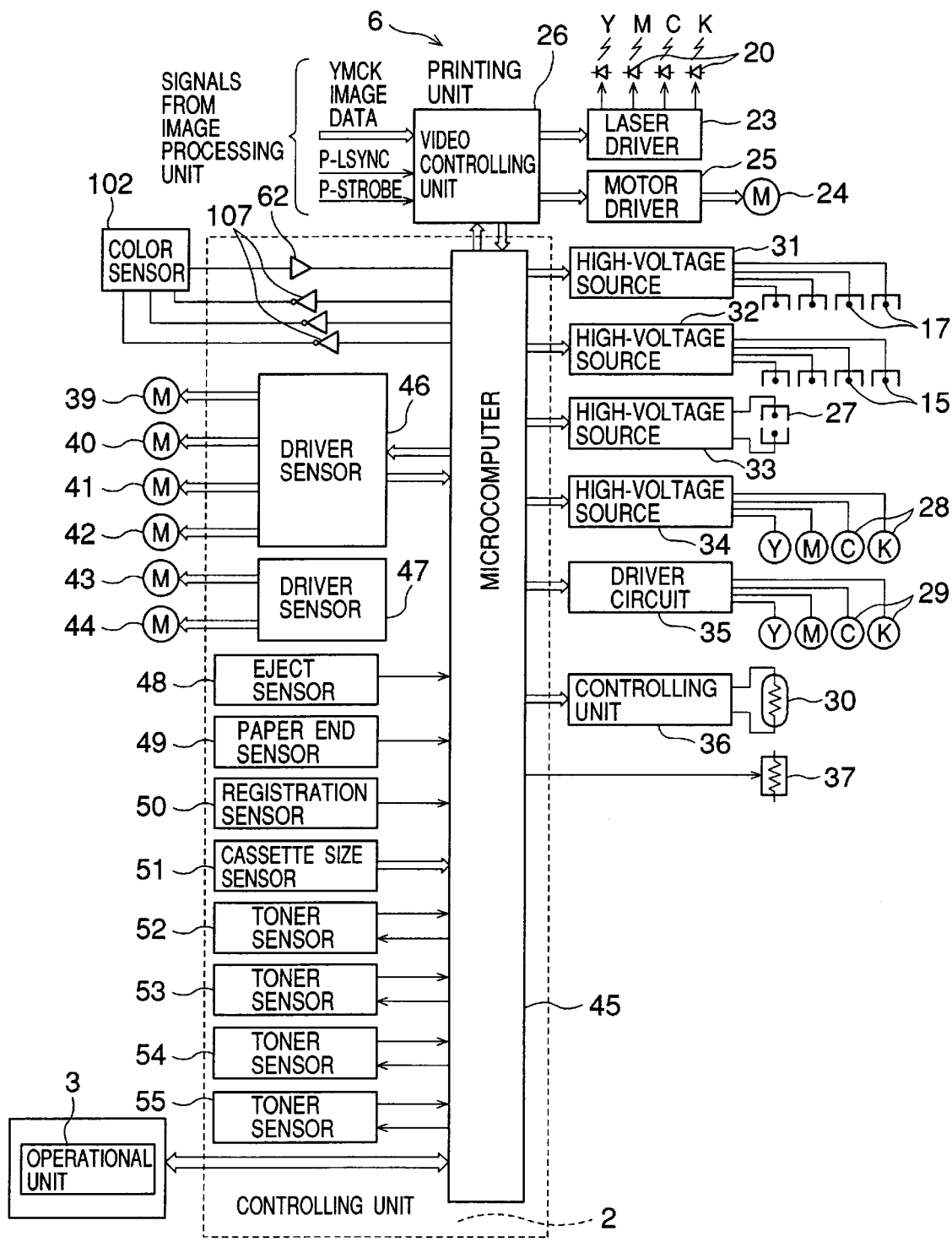
FIG. 10 is a block diagram of an image processing unit shown in FIG. 8.

A description will now be given, with reference to FIGS. 8 to 12, of a second embodiment according to the present invention. In FIGS. 8 to 12, parts that are the same as the parts shown in FIGS. 1 to 6 are given the same reference numerals, and descriptions thereof will be omitted. FIG. 8 is a block diagram of a color copy machine 101 which is the second embodiment according to the present invention. FIG. 9 is a perspective view of a printing unit shown in FIG. 8. FIG. 10 is a block diagram of an image processing unit shown in FIG. 8.

As shown in FIGS. 8 to 10, the construction of the color copy machine 101 is the same as that of the color copy machine 1 of the first embodiment except for a color sensor 102 being provided instead of the sensor unit 7. The color sensor 102 is connected to the controlling unit 2. Similarly to the sensor unit 7 of the first embodiment, the color sensor 102 is positioned near a guide roller 10 and near a side of the transfer belt 9.

Figure 11:
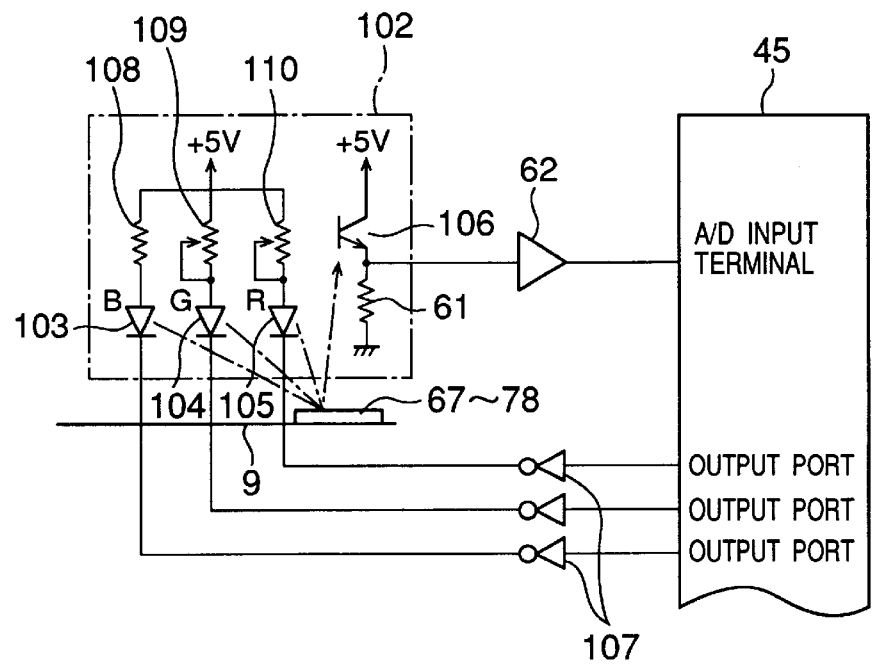
FIG. 11 is a circuit diagram of a color sensor shown in FIG. 8.
Figure 12:
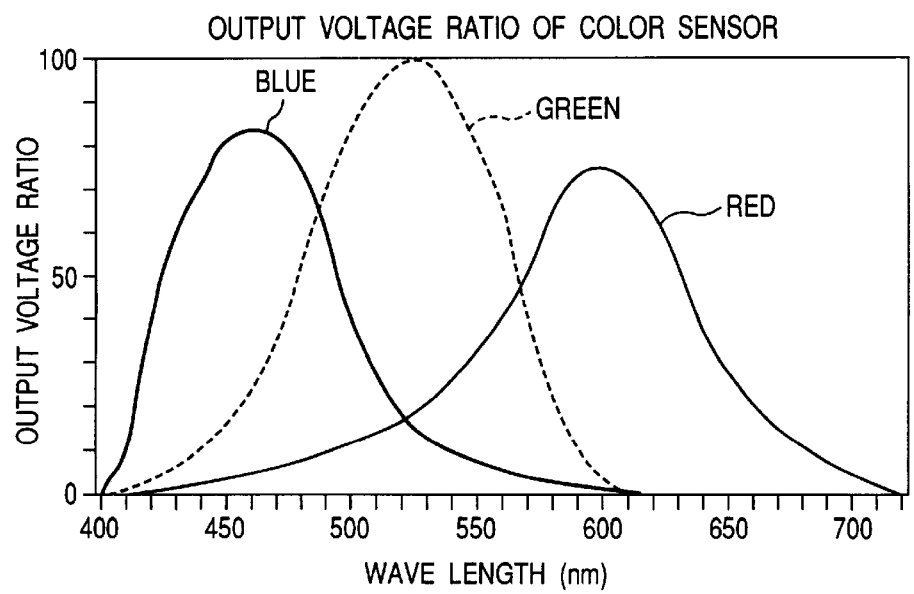
FIG. 12 is a graph showing an output voltage ratio of the color sensor shown in FIG. 8.

The color sensor 102 comprises, as shown in FIG. 11, a blue-light emitting diode (B-LED) 103 which corresponds to a first light-emitting element, a green-light-emitting diode (G-LED) 104 which is a second light-emitting element, a red light-emitting diode (R-LED) 105 which is a third light-emitting element and a single phototransistor 106 which is a light-receiving element.

A light emitted by the B-LED 103 has a peak at a wavelength of about 460 nm which falls within a range from 400 to 500 nm, and thus the light emitted by the B-LED 103 is a blue light. A light emitted by the G-LED 104 has a peak at a wavelength of about 530 nm which falls within a range from 500 to 600 nm, and thus the light emitted by the G-LED 104 is a green light. A light emitted by the R-LED 105 has a peak at a wavelength of about 600 nm which falls within a range from 600 to 700 nm, and thus the light emitted by the R-LED 105 is a red light. Since the phototransistor 106 is sensitive to a light having a wavelength ranging from 400 to 700 nm, the phototransistor 106 is sensitive to lights emitted by each of the light-emitting diodes 103 to 105.

A cathode of each of the light-emitting elements 103 to 105 is connected to a transistor array 107 as shown in FIG. 11. Each transistor array 107 is connected to a respective output port of the microcomputer 45. An anode of the B-LED 103 is connected to a resistor 108. An anode of the G-LED 104 is connected to a variable resistor 109. An anode of the R-LED 105 is connected to a variable resistor 110. Accordingly, intensity of light emitted by the G-LED 104 and the R-LED 105 can be varied. Additionally, the phototransistor 106 is connected to the resistor 61 and the amplifier 62. The amplifier 62 is connected to the A/D input terminal of the microcomputer 45. The resistor 61 converts a current signal output from the phototransistor 106 to a voltage signal.

In the color copy machine 101, the patch patterns 67 to 78 are formed in the same manner as that of the first embodiment, and are read by the single phototransistor 106. When the phototransistor 106 reads the yellow patches 67 to 69, only the B-LED 103 is turned on. When the phototransistor 106 reads the magenta patches 70 to 72, only the G-LED 104 is turned on. When the phototransistor 106 reads the cyan patches 73 to 75, only the R-LED 105 is turned on. When the phototransistor 106 reads the black patches 76 to 78, only the G-LED 104 is turned on.

Accordingly, intensity of each of color toner images can be separately corrected in the same manner as in the first embodiment.

It should be noted that currents supplied to the G-LED 104 and R-LED 105 are adjusted by the variable resistors 109 and 110 so that an output level of the phototransistor 106 becomes equal to the output level when the medium intensity black patch 77 is irradiated by the B-LED 103. This is because a variation of the intensity appears at a maximum in the medium-intensity black patch 77, and thereby the output level of each of the light-emitting elements 103 to 105 can be adjusted with a high accuracy. Additionally, the amplifying level of the amplifier 62 does not need to be varied for each of the light-emitting elements 103 to 105 so as to maintain the linearity of the amplifying characteristic of the amplifier 62.

The intensity of light emitted by the B-LED 103 is normally lower than that of the G-LED 104 and R-LED 105 due to a nature of the light-emitting element. In order to obtain the same intensity of light, in the present embodiment, the intensity level of the light emitted by the G-LED 104 and the R-LED 105 is adjusted based on the intensity level of the light emitted by the B-LED 102.

Additionally, the amplifying level of the amplifier 62 is set so that the maximum output level of the amplifier 62 is slightly less than a voltage of a power source. More specifically, the voltage of the power source is 15 V, and the voltage output from the color sensor 102 is about 1 V when the high-intensity patches 67, 70, 73 and 76 are read. If the transfer belt 9 is read, the voltage output from the color sensor 102 becomes as high as 3 V. If the output voltage corresponding to the surface of the transfer belt 9 is needed, the amplification ratio of the amplifier 62 should be less than five (5) times. However, if the surface of the transfer belt is not read, the amplification ratio of the amplifier 62 can be as high as fourteen (14) times, that is, the output voltage of 1 V is increased to 14 V at maximum. In this condition, the voltage supplied to the microcomputer 45 via the amplifier 62 when the color sensor 102 reads the low intensity patches 69, 72, 75 and 78 is about 5 V. This amplification provides a great accuracy for reading the patch patterns 67 to 78.

In this embodiment, the correcting operation for the intensity of each of the color toner images is separately performed in the same manner as that of the first embodiment. However, in this embodiment, when the yellow patches 67 to 69 are read, only the B-LED 103 is turned on. When the magenta patches 70 to 72 are read, only the G-LED 104 is turned on. When the cyan patches 73 to 75 are read, only the R-LED 105 is turned on. When the black patches 76 to 78 are read, only the G-LED 104 is turned on. In order to achieve the above-mentioned reading operation, the controlling unit 2 counts a reference clock signal which is synchronous with an operation of the driver circuit 46 driving the motor 40 of the transfer belt 9 so as to obtain a lighting timing of each of the light-emitting elements 103 to 105. The reading operation is performed when the sensing area of the color sensor 102 corresponds to the center of each patch pattern.

The phototransistor 106 of the color sensor 102 receives a light having an intensity in inverse proportion to the intensity of each patch pattern 67 to 78, and outputs a current in proportion to the intensity of the light. The current is converted into a voltage by the resistor 61, and then the voltage is amplified by the amplifier 62. The amplified voltage is supplied to the microcomputer 45 so as to eliminate noise which may be added in the transmission line between the color sensor 102 and the microcomputer 45.

The correction of the intensity of each color toner image is performed in the same manner as that of the first embodiment. It should be noted that the black patches 76 to 78 can be appropriately read by irradiating them by any one of the light-emitting elements 103 to 105 since black corresponds to a mixture of yellow, magenta and cyan.

In the present embodiment, the output level of the phototransistor 106 may be adjusted using a surface of the transfer belt 9. That is, an intensity of light emitted by the G-LED 104 and the R-LED 105 is adjusted so that the output level of the phototransistor 106 becomes equal to the output level obtained by irradiating the surface of the transfer belt 9 by the B-LED 103. In such a case, the adjustment of the light-emitting elements 103 to 105 can be performed without using the medium-intensity black patch 77.

It should be noted that an electroluminescence element may be used as the light-emitting elements 103 to 105. In such a case, adjustment of the intensity of light should be performed by varying a voltage applied to the electroluminescence element.

A description will now be given, with reference to FIGS. 13 through 19D, of a third embodiment of the present invention. A color copy machine of the third embodiment according to the present invention has the same construction as that of the color copy machine 101 except that a color mixture correcting unit is provided in the third embodiment. Thus, parts of the third embodiment that are the same as the parts of the second embodiment are given the same reference numerals and descriptions thereof will be omitted.

Figure 13:
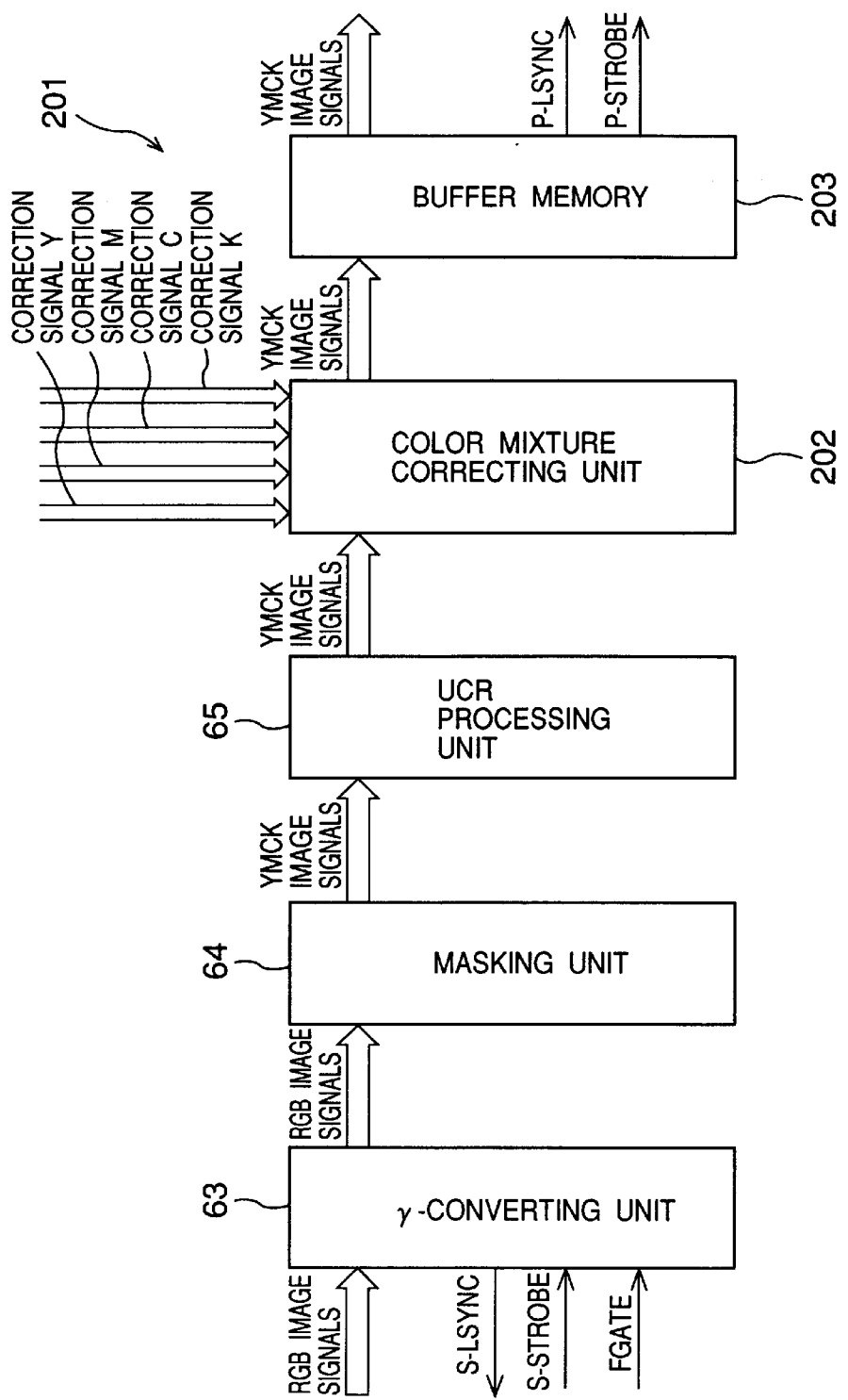
FIG. 13 is a block diagram of an image processing unit shown in FIG. 8.
Figure 14:
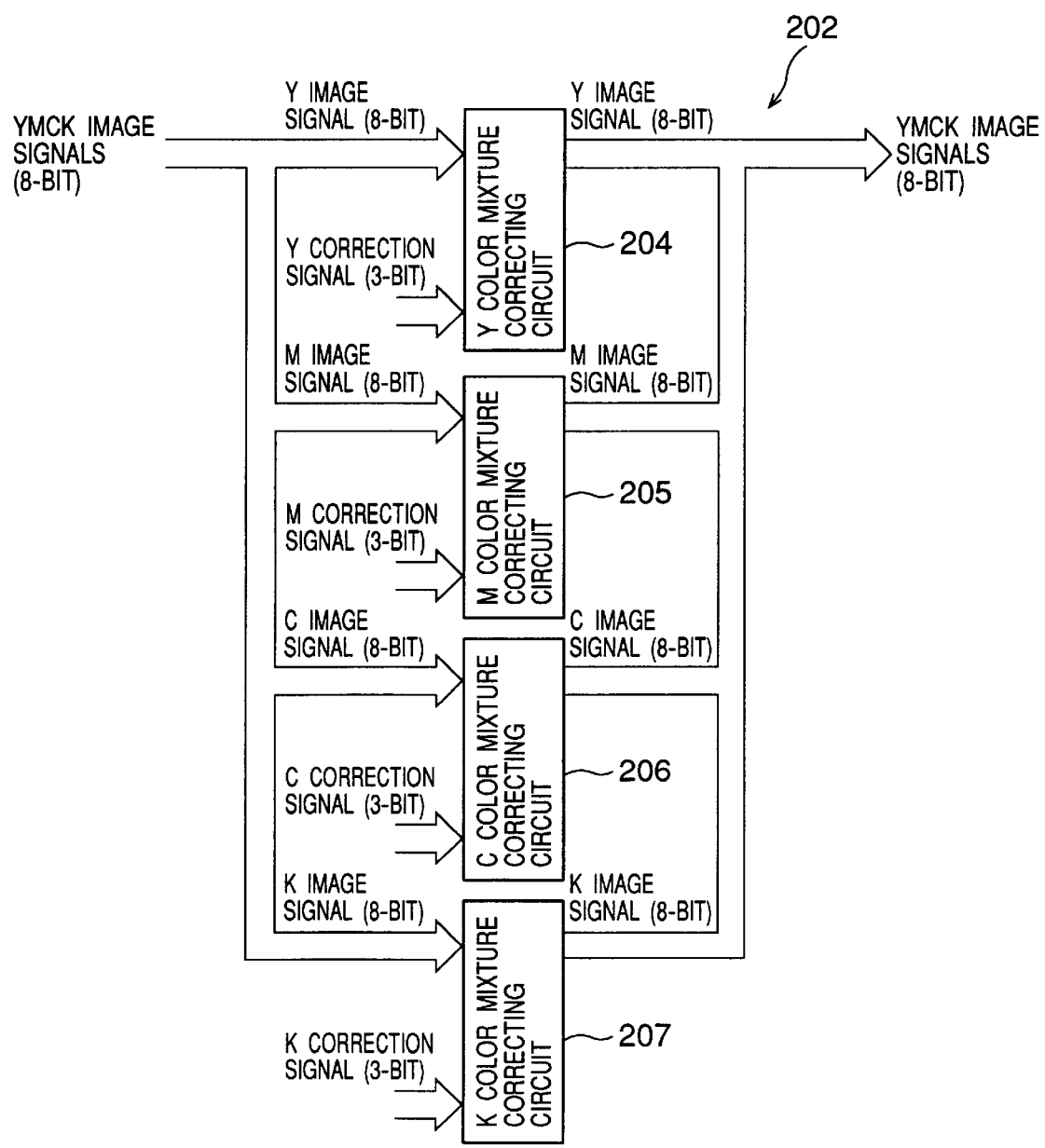
FIG. 14 is a block diagram of a color mixture correcting unit shown in FIG. 13.

FIG. 13 is a block diagram of an image processing unit 201 of the third embodiment. A color mixture correcting unit 202 and a buffer memory 203 are provided in the image processing unit 201. FIG. 14 is a block diagram of the color mixture correcting unit 202. As shown in FIG. 14, the color mixture correcting unit 202 comprises a Y color mixture correcting circuit 204, an M color mixture correcting circuit 205, a C color mixture correcting circuit 206 and a K color mixture correcting circuit 207. The correcting circuits 204 to 207 correct the YMCK data supplied by the UCR processing unit 65 in accordance with look-up tables 208 to 211 shown in FIGS. 15 to 18. A description of the look-up tables 208 to 211 will be given later.

In this embodiment, the patch patterns 67 to 78 are formed in the same manner as the second embodiment. Then, each of the patch patterns 67 to 78 are irradiated, in turn, by the light emitted by each of the light-emitting elements 103 to 105. That is, a blue light, a green light and a red light are projected to each of the patch patterns 67 to 78, and the corresponding outputs of the phototransistor 106 are read.

Currents supplied to the G-LED 104 and R-LED 105 are adjusted so that the output level of the phototransistor 106 when the transfer belt 9 is irradiated by the G-LED 104 and R-LED 105 becomes equal to the output of the phototransistor 106 when the transfer belt 9 is irradiated by the light emitted by the B-LED 103. The surface of the transfer belt 9 irradiated by the light from the color sensor 102 is white which is achromatic. This adjustment corresponds to a sensor controlling means.

The above-mentioned output levels of the phototransistor 106 corresponding to the B-LED 103, G-LED 104 and R-LED 105 are stored in a memory in the microcomputer 45. This memory corresponds to an output storing means.

When a correction of the color mixture is performed, the transfer belt 9 is irradiated by each light from the B-LED 103, the G-LED 104 and the R-LED 105 so as to compare the corresponding output levels with that initially stored in the memory of the microcomputer 45. The output level of the phototransistor 106 is corrected based on the comparison result. Accordingly, fluctuation in the output level of the color sensor 102 due to aging or other reasons is corrected before the correction of the color mixture is performed. This enables the color sensor 102 to read the patch patterns 67 to 78 always at the same output level.

Then the patch patterns 67 to 78 are read sequentially by the color sensor 102 so as to detect a mixture of colors. The correction signals Y, M, C and K are supplied to the color mixture correcting unit 202 from the microcomputer 45 in accordance with the results of the detection.

The color mixture correcting unit 202 corrects each of the YMCK image signals input from the UCR processing unit 65, and outputs the corrected YMCK image signals to the buffer memory 203. Each of the YMCK image signals is processed by the corresponding color mixture correcting circuit 204 to 207 shown in FIG. 14 in accordance with the correction signal supplied by the microcomputer 45. An operation of each of the color mixture correcting circuits 204 to 207 is controlled by the correction signals Y, M, C and K so that the YMCK image signals are processed in accordance with a correction represented by one of the look-up tables 208 to 211.

A description will now be given, with reference to FIGS. 19A to 19D, of an operation for correcting the YMCK image signals. FIGS. 19A to 19D are parts of the operation for correcting the YMCK image signals. In the figures, the notation A of FIG. 19A connects to the notation A of FIG.

Figure 19A:
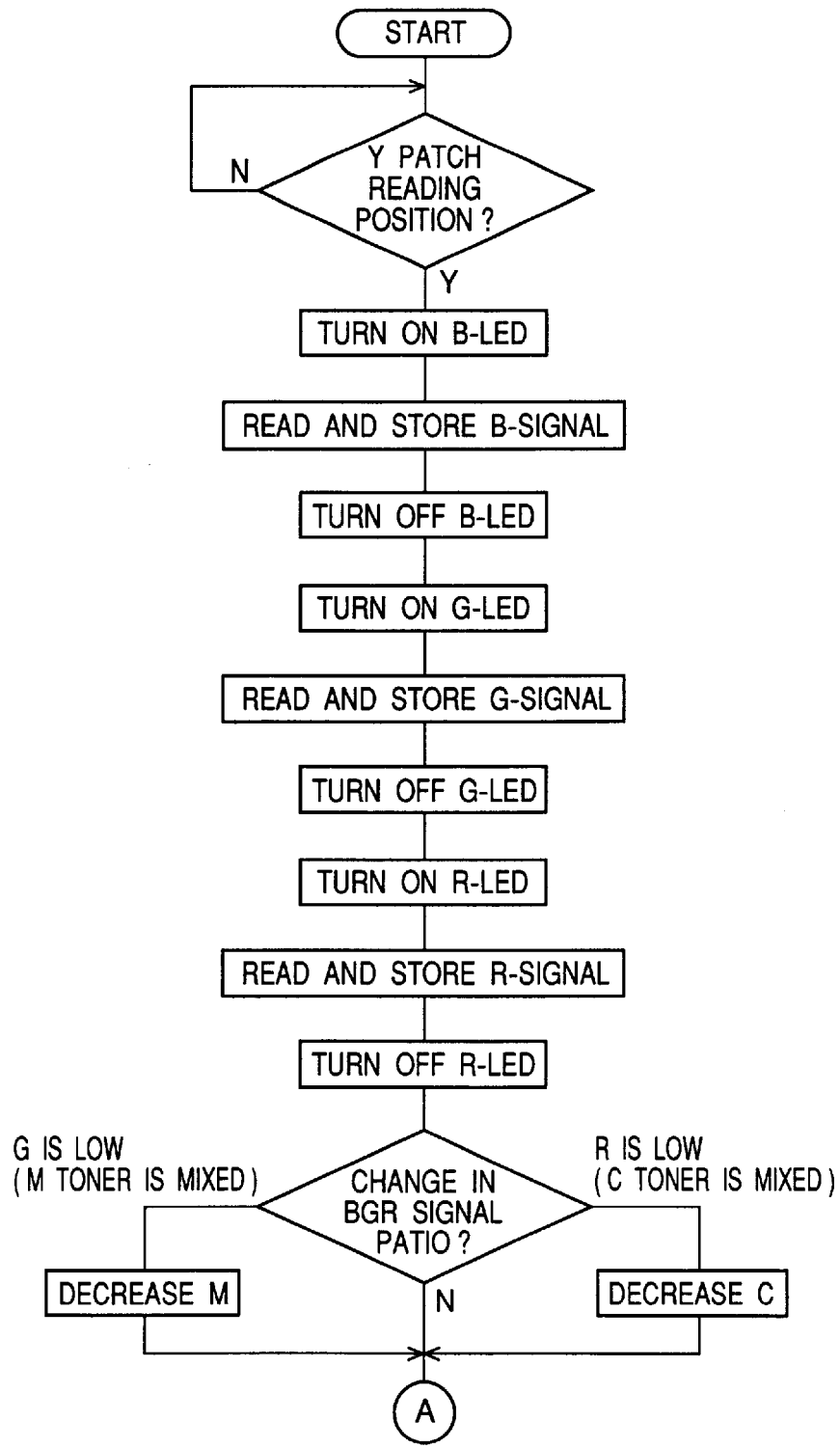
FIG. 19A, 19B, 19C and 19D are parts of a flowchart of an operation for correcting a mixture of colors.
Figure 19B:
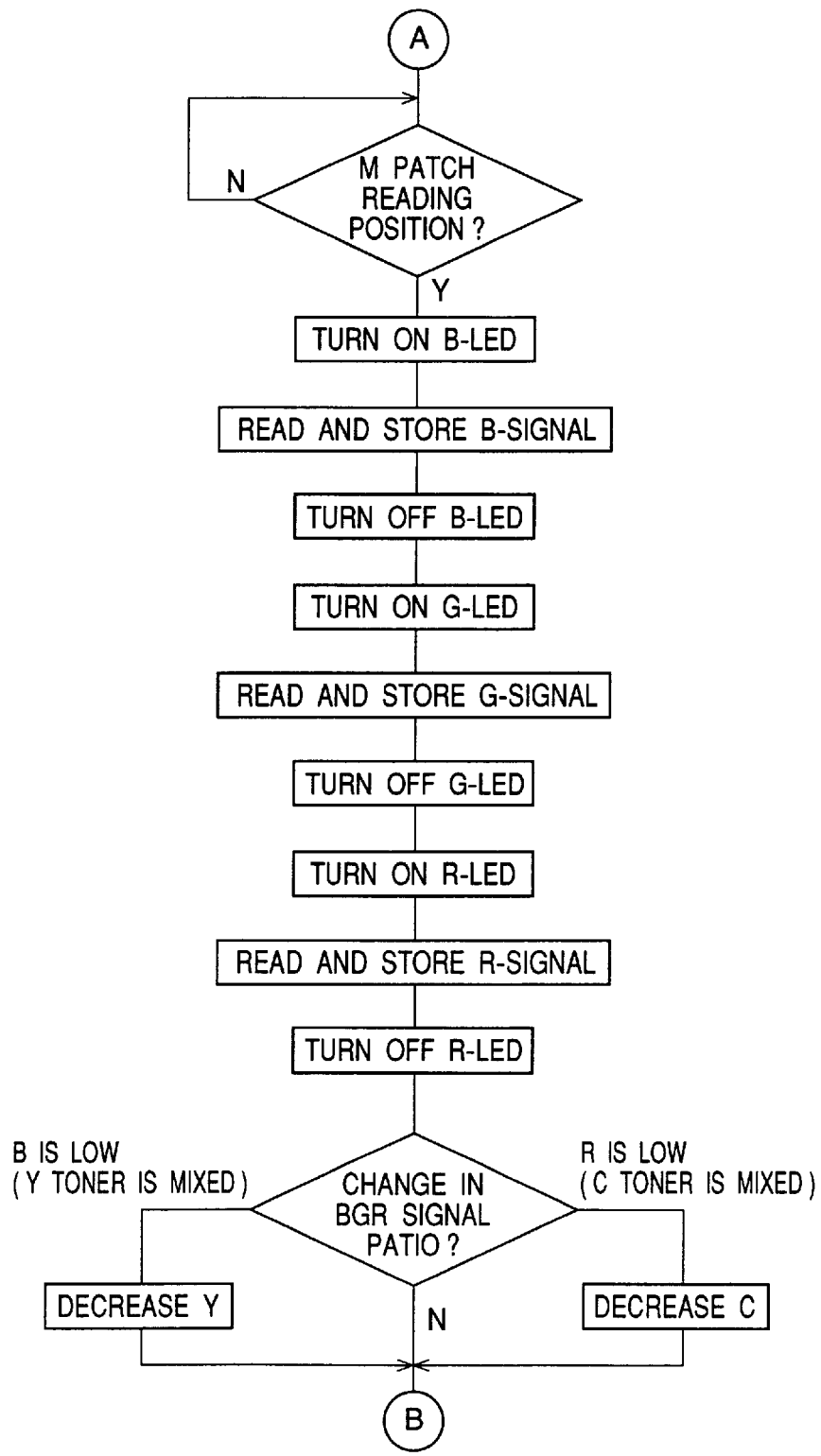
Figure 19C:
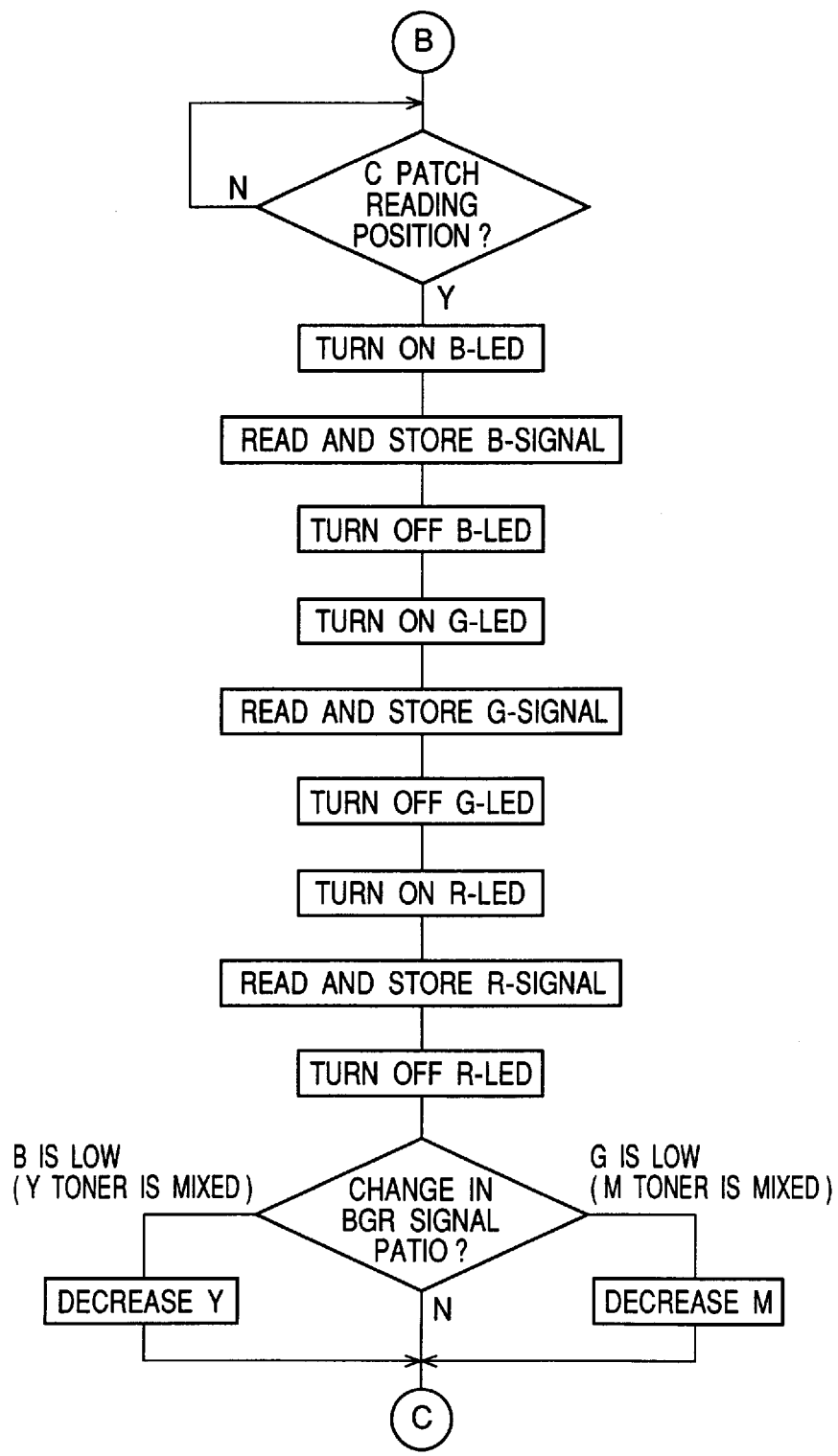
Figure 19D:
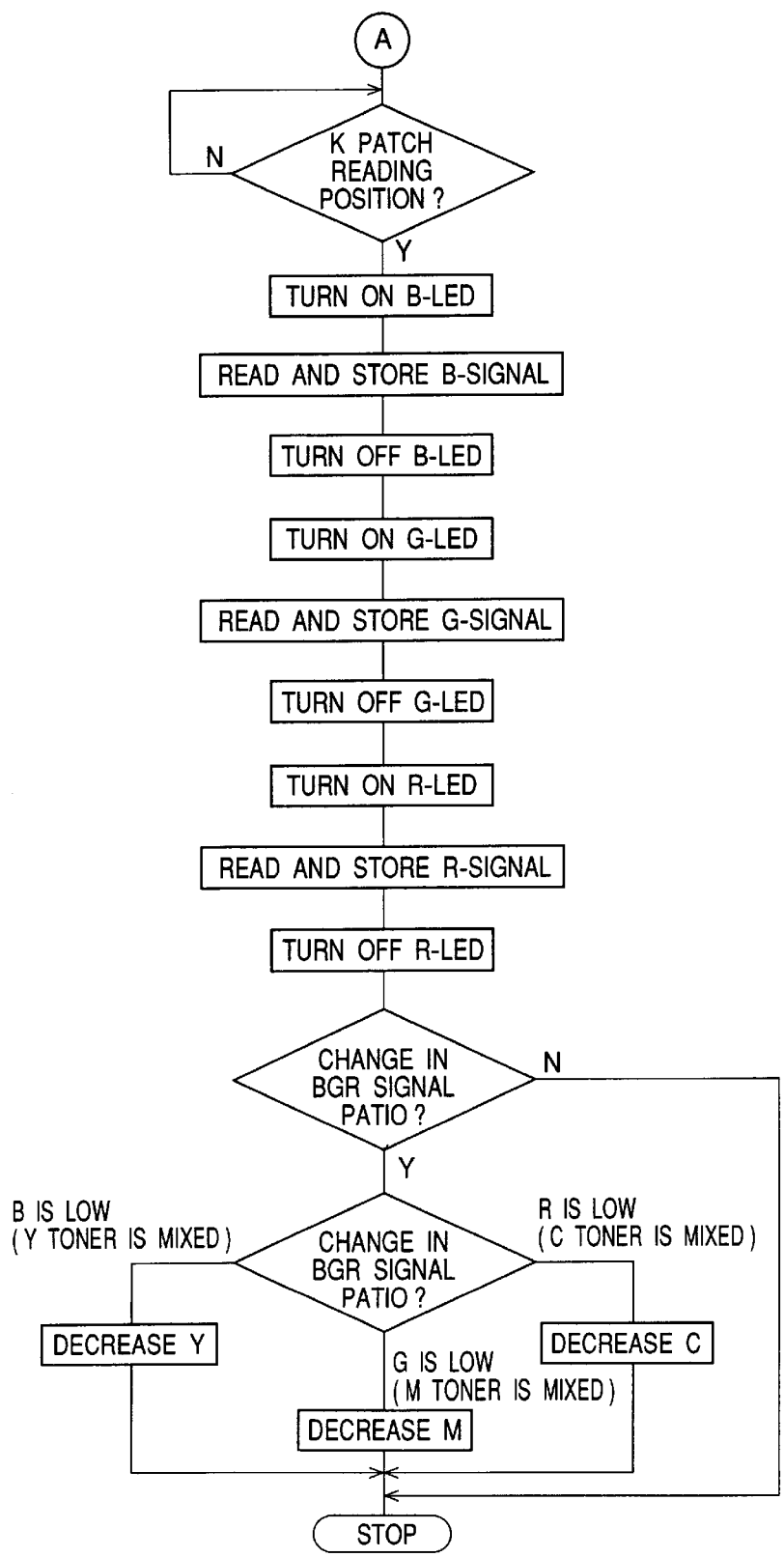

19B, the notation B of FIG. 19B connects to the notation B of FIG. 19C, and the notation C of FIG. 19C connects to the notation C of FIG. 19D.

The color sensor 102 reads the patch patterns 67 to 78 sequentially in accordance with the movement of the transfer belt 9. The yellow patches 67 to 69 are read first by irradiating a blue light, a green light and a red light which are emitted by the corresponding light-emitting elements 103 to 105, in that order, and the output signals corresponding to the blue light, the green light and the red light are read and stored in the microcomputer 45.

If there is no mixture of colors in the yellow patches 67 to 69, only the output level corresponding to the blue light is decreased. This is because yellow patches absorb the blue light but not the green light and the red light. The output levels of the phototransistor 106 corresponding to the light-emitting elements 103 to 105 are adjusted to be at the same level. This level information is stored in the microcomputer 45. The level of the output signals corresponding to the light-emitting elements 103 to 105 are then compared with the stored level information by the microcomputer 45, respectively.

If it is determined by the comparison that the level of the output signal (G-signal) corresponding to the green light is decreased, the microcomputer 45 sends the correction signal M to the color mixture correcting unit 202 to decrease the intensity of the magenta toner image. This is because if yellow is mixed with magenta, absorption for the blue light is decreased and absorption of the green light is increased.

If it is determined by the comparison that the level of the output signal (R-signal) corresponding to the red light is decreased, the microcomputer 45 sends the correction signal C to the color mixture correcting unit 202 to decrease the intensity of the cyan toner image. This is because, if yellow is mixed with cyan, absorption of the blue light is decreased and absorption for the red light is increased.

The above-mentioned operation corresponds to a flow-chart shown in FIG. 19A. Similar operations are performed on other color patches 70 to 78 as shown in FIGS. 19B to 19D.

A description will now be given of a correction performed by the color mixture correcting unit 202. The color mixture correcting unit 202 selects one of the corrections represented by the look-up tables 204 to 207. Each of the look-up tables 204 to 207 represents a relationship among the signals input to and output from the color mixture correcting circuits 204 to 207.

For example, if it is determined that there is no mixture of colors, no correction is performed when forming an image. On the other hand, if magenta toner is mixed into yellow toner, intensity of magenta is increased in a printed multicolor image. In such a case, since the mixing of the magenta toner is detected as mentioned above, the correction signal M is supplied from the microcomputer 45 to the color mixture correcting unit 202 so as to decrease the intensity of magenta toner.

Each of the color mixture correcting circuits 204 to 207 of the color mixture correcting unit 202 is operated in accordance with the correction represented by the look-up table 208 shown in FIG. 15 when it is determined that there is no mixture of colors. That is, according to the look-up table 208, no correction is applied to the input YMCK signals. As shown in FIG. 15, a value corresponding to the 3 most significant bit positions in the look-up table 208 is zero (0). That is, a value of zero is input to the 3 most significant bit positions of the color mixture correcting circuits 204 to 207.

In this case, no correction is applied and thus the bit signals of the YMCK signals input to the 8 least significant bit positions of the color mixture correcting circuits 204 to 207 are output without change.

If it is determined that magenta toner is mixed into yellow toner and that the intensity level of the magenta toner image needs to be decreased by two grades, the look-up table 210 shown in FIG. 17 is selected for the M color mixture correcting circuit 205 according to the correction signal M. According to the look-up table 210, a value of 2 is input to the 3 most significant bit positions, which condition represents that the gradation level is decreased by two grades. Accordingly, the bit signals representing a value of "05" are changed to a value of "03" in the 8-bit signals output from the M color mixture correcting circuit 205. Therefore, the intensity of the magenta toner image formed by the magenta printing station is decreased to compensate for the mixture of magenta toner into the yellow toner.

Similar operations are performed for other color component toner images when the correction is needed. Accordingly, a color balance in the multicolor image is maintained well even when the mixture of color toners occurs.

It should be noted that although four look-up tables are used in the present embodiment, a maximum of eight ($2^3=8$) look-up tables can be used since 3 bit positions are assigned to the value for indicating the correction level.

In the present embodiment, the correction due to the mixture of color toners is applied to each color component toner image. However, the correction to the yellow toner image may be omitted because there is little possibility that other color toner is mixed into the yellow toner image which is formed in the first position. Additionally, the correction to the black toner image may also be omitted because a mixture of another color toner hardly affects the black toner image.

Although the color sensor having three light-emitting elements 103 to 105 is used in the present embodiment, the color sensor comprising three light-receiving elements and a single light source, such as the one used in the first embodiment, may be used.

The above-mentioned first to third embodiments according to the present invention are described with the color copy machine in which a multicolor image is formed by superimposing a plurality of color component toner images. The present invention is not limited to the image forming apparatus using color toner, and is applicable to an image forming apparatus using a color ink printing method or a color thermal transferring method.

Additionally, although the surface of the transfer belt 9 is used when the adjusting operation for the output level of color sensors 57 or 102 is performed, a gray scale attached to the transfer belt 9 may instead be used, or a surface of the printing paper 8 or a chart paper prepared beforehand may also be used.

The present invention is not limited to the specifically disclosed embodiments, and variations and modifications may be made without departing from the scope of the present invention.

What is claimed is:

1. A color image forming apparatus for forming a multicolor image by superimposing a plurality of color component images on a printing paper, each of the color component images being formed by one of predetermined color developing agents, said color image forming apparatus comprising:

pattern printing means for printing color patterns having an intensity gradation by using each of said predetermined color developing agents, the color patterns being printed on one of the printing paper, a carrier conveying the printing paper and a photosensitive drum;

a color sensor provided at a position in which each of said color patterns is read, said color sensor having a spectral characteristic corresponding to each of said predetermined color developing agents and being sensitive to a color of each of said predetermined color developing agents;

reading means for reading output signals of said color sensor corresponding to each of said color patterns;

intensity correcting means for separately correcting an intensity of each of said color component images in accordance with the corresponding output signals of said color sensor;

color mixture detecting means for detecting a mixture of colors in each of said color component images by using said color patterns; and color mixture correcting means for correcting an intensity of one of said color component images when the mixture of colors is detected so that a color balance of the multicolor image is maintained at a desired condition.

2. The color image forming apparatus as claimed in claim 1, wherein said color sensor comprises a first light-receiving element sensitive to a blue light, a second light-receiving element sensitive to a green light and a third light-receiving element sensitive to a red light.

3. The color image forming apparatus as claimed in claim 2, wherein said pattern printing means prints said color patterns including yellow patterns, magenta patterns and cyan patterns, said reading means reading output signals of said first light-receiving element when said yellow patterns are read, said reading means reading output signals of said second light-receiving element when said magenta patterns are read, said reading means reading output signals of said third light-receiving element when said cyan patterns are read.

4. The color image forming apparatus as claimed in claim 3, wherein said pattern printing means further prints black patterns, and said reading means reads output signals of one of said first to third light-receiving elements.

5. The color image forming apparatus as claimed in claim 1, wherein the output signals of said color sensor are read at a timing determined by a clock signal provided for an operation of said image forming apparatus.

6. The color image forming apparatus as claimed in claim 1, wherein said color sensor comprises a first light-emitting element emitting a blue light, a second light-emitting element emitting a green light, a third light-emitting element emitting a red light and a light-receiving element sensitive to the blue light, the green light and the red light.

7. The color image forming apparatus as claimed in claim 6, wherein a reading timing of the output signals of said color sensor and a light emitting timing of each of said first to third light-emitting elements are determined by a clock signal provided for an operation of said image forming apparatus.

8. The color image forming apparatus as claimed in claim 6, wherein said pattern printing means further prints black patterns, and one of the blue light, the green light and the red light is emitted when said reading means reads output signals corresponding to the black patterns.

9. The color image forming apparatus as claimed in claim 1, wherein said color sensor comprises a first light-emitting element emitting a blue light, a second light-emitting element emitting a green light, a third light-emitting element emitting a red light and a light-receiving element sensitive to three lights including the blue light, the green light and the red light;

said pattern printing means prints said color patterns including yellow patterns, magenta patterns and cyan patterns, the blue light being emitted by said first light-emitting element when said reading means reads output signals corresponding to the yellow patterns, the green light being emitted by said second light-emitting element when said reading means reads output signals corresponding to the magenta patterns, the red light being emitted by said third light-emitting element when said reading means reads output signals corresponding to the cyan patterns, said color image forming apparatus further comprising:

output level storing means for storing first output levels of said light-receiving element when an achromatic medium is irradiated by each of said three lights emitted by said first to third light-emitting elements, respectively; and output level correcting means for correcting second output levels of said light-emitting element, which are currently being measured and correspond to each of said three lights, by comparing the second output levels with the first output levels previously stored by said output level storing means.

10. The color image forming apparatus as claimed in claim 1, wherein said color sensor comprises a first light-receiving element sensitive to a blue light, a second light-receiving element sensitive to a green light and a third light-receiving element sensitive to a red light;

said pattern printing means prints said color patterns including yellow patterns, magenta patterns and cyan patterns, said reading means reading output signals of said first light-receiving element when said yellow patterns are read, said reading means reading output signals of said second light-receiving element when said magenta patterns are read, and said reading means reading output signals of said third light-receiving element when said cyan patterns are read; and said printing paper and said carrier include an achromatic medium, said color image forming apparatus further comprising:

output level correcting means for correcting an output level of each of said first to third light-receiving elements so that the output level of each of said first to third light-receiving means becomes the same when said achromatic medium is read by said color sensor; and output level storing means for storing a first output level of each of said first to third light-receiving elements when said achromatic medium is read by said color sensor, said output level correcting means correcting a second output level of each of said first to third light-receiving elements, which are currently being measured, by comparing the second output level with the first output level previously stored by said output level storing means.

11. The color image forming apparatus as claimed in claim 10, wherein an amplifier is connected to each of said first to third light-receiving elements, and said output level correcting means corrects the first and second output levels by changing an amplification of said amplifier.

12. The color image forming apparatus as claimed in claim 1, wherein said predetermined color developing agents are color toners.

13. The color image forming apparatus as claimed in claim 1, wherein said predetermined color developing agents are color ink.

14. The color image forming apparatus as claimed in claim 1, wherein said predetermined color developing agents are color thermal transfer agents.

15. The color image forming apparatus as claimed in claim 1, wherein said color mixture detecting means detects a mixture of one of the color developing agents corresponding to a first color component image into a second color component image, and said color mixture correcting means decreases an intensity of the first color component image.

16. The color image forming apparatus as claimed in claim 1, wherein said color mixture detecting means does not detect a mixture of colors in one of the color component images printed first.

17. The color image forming apparatus as claimed in claim 1, wherein said color patterns include a yellow pattern, a magenta pattern, a cyan pattern and a black pattern, and said color mixture detecting means does not detect a mixture of colors in the black pattern.

18. A color image forming apparatus for forming a multi-color image by superimposing a plurality of color component images on a printing paper, each of the color component images being formed by one of predetermined color developing agents, said color image forming apparatus comprising:

pattern printing means for printing color patterns having an intensity gradation by using each of said predetermined color developing agents, the color patterns being printed on one of the printing paper, a carrier conveying the printing paper and a photosensitive drum;

a color sensor provided at a position in which each of said color patterns is read, said color sensor having a spectral characteristic corresponding to each of said predetermined color developing agents and being sensitive to a color of each of said predetermined color developing agents;

reading means for reading output signals of said color sensor corresponding to each of said color patterns; and intensity correcting means for separately correcting an intensity of each of said color component images in accordance with the corresponding output signals of said color sensor;

wherein said color sensor comprises a first light-emitting element emitting a blue light, a second light-emitting element emitting a green light, a third-light emitting element emitting a red light and a light-receiving element sensitive to the blue light, the green light and the red light;

wherein one of said printing paper and said carrier includes an achromatic medium, and an input power supplied to each of said second light-emitting element and said third light-emitting element is adjusted so that output levels of said light-receiving element when said achromatic medium is irradiated by the green light emitted by said second light-emitting element and the red light emitted by said third light-emitting element become equal to an output level of said light-receiving element when the black pattern is irradiated by the blue light emitted by said first light-emitting element.

19. The color image forming apparatus as claimed in claim 18, wherein said achromatic medium is a black pattern printed by said pattern printing means.

20. The color image forming apparatus as claimed in claim 18, wherein an amplifier is connected to said light-receiving element of said color sensor for amplifying an output voltage of said light-receiving element, an amplification of said amplifier being set so that an amplified output voltage of said amplifier is less than a power source voltage supplied to said amplifier.

21. A color image forming apparatus comprising:

a color sensor having a spectral characteristic to read color test patterns, an output of said color sensor representing a mixture ratio of color components in each color test pattern; and a color mixture correcting circuit for correcting a mixture of colors in accordance with an output of said color sensor, wherein said color mixture correcting circuit decreases intensity of a color component when an intensity of said color component in said color test pattern is increased due to mixture of said color component with at least one other color component so that a color image corresponding to said color component is formed by decreased intensity of said color component.

22. A color image forming apparatus for forming a multi-color image by superimposing a plurality of color component images on a printing paper, each of the color component images being formed by one of predetermined color developing agents, said color image forming apparatus comprising:

a pattern printer printing color patterns having an intensity gradation by using each of said predetermined color developing agents, the color patterns being printed on one of the printing paper, a carrier conveying the printing paper and a photosensitive drum;

a color sensor provided at a position in which each of said color patterns is read, said color sensor having a spectral characteristic corresponding to each of said predetermined color developing agents and being sensitive to a color of each of said predetermined color developing agents;

a reader reading output signals of said color sensor corresponding to each of said color patterns;

an intensity corrector separately correcting an intensity of each of said color component images in accordance with the corresponding output signals of said color sensor;

a color mixture detector detecting a mixture of colors in each of said color component images by using said color patterns; and a color mixture corrector correcting an intensity of one of said color component images when the mixture of colors is detected so that a color balance of the multi-color image is maintained at a desired condition.

23. The color image forming apparatus as claimed in claim 22, wherein said color sensor comprises a first light-emitting element emitting a blue light, a second light-emitting element emitting a green light, a third light-emitting element emitting a red light and a light-receiving element sensitive to the blue light, the green light and the red light.

24. The color image forming apparatus as claimed in claim 23, wherein a reading timing of the output signals of said color sensor and a light emitting timing of each of said first to third light-emitting elements are determined by a clock signal provided for an operation of said image forming apparatus.

25. The color image forming apparatus as claimed in claim 23, wherein one of said printing paper and said carrier includes an achromatic medium, and an input power supplied to each of said second light-emitting element and said third light-emitting element is adjusted so that output levels of said light-receiving element when said achromatic medium is irradiated by the green light emitted by said second light-emitting element and the red light emitted by said third light-emitting element become equal to an output level of said light-receiving element when the black pattern is irradiated by the blue light emitted by said first light-emitting element.

26. The color image forming apparatus as claimed in claim 22, wherein said color sensor comprises a first light-emitting element emitting a blue light, a second light-emitting element emitting a green light, a third light-emitting element emitting a red light and a light-receiving element sensitive to three lights including the blue light, the green light and the red light;

said pattern printer prints said color patterns including yellow patterns, magenta patterns and cyan patterns, the blue light being emitted by said first light-emitting element when said reader reads output signals corresponding to the yellow patterns, the green light being emitted by said second light-emitting element when said reader reads output signals corresponding to the magenta patterns, the red light being emitted by said third light-emitting element when said reader reads output signals corresponding to the cyan patterns, said color image forming apparatus further comprising:

an output level memory storing first output levels of said light-receiving element when an achromatic medium is irradiated by each of said three lights emitted by said first to third light-emitting elements, respectively; and an output level corrector correcting second output levels of said light-emitting element, which are currently being measured and correspond to each of said three lights, by comparing the second output levels with the first output levels previously stored by said output level memory.

27. The color image forming apparatus as claimed in claim 22, wherein said color sensor comprises a first light-receiving element sensitive to a blue light, a second light-receiving element sensitive to a green light and a third light-receiving element sensitive to a red light;

said pattern printer prints said color patterns including yellow patterns, magenta patterns and cyan patterns, said reader reading output signals of said first light-receiving element when said yellow patterns are read, said reader reading output signals of said second light-receiving element when said magenta patterns are read, and said reader reading output signals of said third light-receiving element when said cyan patterns are read; and said printing paper and said carrier include an achromatic medium, said color image forming apparatus further comprising:

an output level corrector correcting an output level of each of said first to third light-receiving elements so that the output level of each of said first to third light-receiving elements becomes the same when said achromatic medium is read by said color sensor; and an output level memory storing a first output level of each of said first to third light-receiving elements when said achromatic medium is read by said color sensor, said output level corrector correcting a second output level of each of said first to third light-receiving elements, which are currently being measured, by comparing the second output level with the first output level previously stored by said output level memory.

28. A method for forming a multi-color image by superimposing a plurality of color component images on a printing paper, each of the color component images being formed by one of predetermined color developing agents, said method comprising the steps of:

printing color patterns having an intensity gradation by using each of said predetermined color developing agents, the color patterns being printed on one of the printing paper, a carrier conveying the printing paper and a photosensitive drum;

reading each of said color patterns by a color sensor having a spectral characteristic corresponding to each of said predetermined color developing agents and being sensitive to a color of each of said predetermined color developing agents;

reading output signals of said color sensor corresponding to each of said color patterns;

separately correcting an intensity of each of said color component images in accordance with the corresponding read output signals of said color sensor;

detecting a mixture of colors in each of said color component images by using said color patterns; and correcting an intensity of one of said color component images when the mixture of colors is detected so that a color balance of the multicolor image is maintained at a desired condition.

29. The method of forming a multi-color image as claimed in claim 28, wherein said color sensor comprises a first light-emitting element emitting a blue light, a second light-emitting element emitting a green light, a third light-emitting element emitting a red light and a light-receiving element sensitive to the blue light, the green light and the red light, and wherein in the step of reading output signals of said color sensor a reading timing of the output signals of said color sensor and a light emitting timing of each of said first to third light-emitting elements are determined by a clock signal provided for an operation of said image forming apparatus.

30. The method of forming a multi-color image as claimed in claim 28, wherein said color sensor comprises a first light-emitting element emitting a blue light, a second light-emitting element emitting a green light, a third light-emitting element emitting a red light and a light-receiving element sensitive to the blue light, the green light and the red light, and wherein one of said printing paper and said carrier includes an achromatic medium, and further comprising the step of adjusting an input power supplied to each of said second light-emitting element and said third light-emitting element so that output levels of said light-receiving element when said achromatic medium is irradiated by the green light emitted by said second light-emitting element and the red light emitted by said third light-emitting element become equal to an output level of said light-receiving element when the black pattern is irradiated by the blue light emitted by said first light-emitting element.

31. The method for forming a multi-color image as claimed in claim 28, wherein said color sensor comprises a first light-emitting element emitting a blue light, a second light-emitting element emitting a green light, a third light-emitting element emitting a red light and a light-receiving element sensitive to three lights including the blue light, the green light and the red light;

and wherein said printing step prints said color patterns including yellow patterns, magenta patterns and cyan patterns, the blue light being emitted by said first light-emitting element in said reading step reads output signals corresponding to the yellow patterns, the green light being emitted by said second light-emitting element in said reading step reads output signals corresponding to the magenta patterns, the red light being emitted by said third light-emitting element in said reading step reads output signals corresponding to the cyan patterns, and further comprising the steps of:

storing first output levels of said light-receiving element when an achromatic medium is irradiated by each of said three lights emitted by said first to third light-emitting elements, respectively; and correcting second output levels of said light-emitting element, which are currently being measured and correspond to each of said three lights, by comparing the second output levels with the first output levels previously stored.

32. The method of forming a multi-color image as claimed in claim 28, wherein said color sensor comprises a first light-receiving element sensitive to a blue light, a second light-receiving element sensitive to a green light and a third light-receiving element sensitive to a red light;

said printing step prints said color patterns including yellow patterns, magenta patterns and cyan patterns, said reading step reads output signals of said first light-receiving element when said yellow patterns are read, said reading step reading output signals of said second light-receiving element when said magenta patterns are read, and said reading step reading output signals of said third light-receiving element when said cyan patterns are read; and said printing paper said carrier include an achromatic medium, further comprising the steps of:

correcting an output level of each of said first to third light-receiving elements so that the output level of each of said first to third light-receiving elements becomes the same when said achromatic medium is read by said color sensor; and storing a first output level of each of said first to third light-receiving elements when said achromatic medium is read by said color sensor, said step of correcting the second output level of each of said first to third light-receiving elements comparing the second output level with the first output level previously stored.

33. A method for forming a multi-color image, comprising the steps of:

printing color patterns having an intensity gradation on one of printing paper, a carrier conveying the printing paper and a photosensitive drum;

reading the printed color patterns by a plurality of light-emitting elements;

adjusting output levels of the plurality of light-emitting elements to be at a same level;

storing information of the adjusted output levels of the plurality of light-emitting elements;

comparing levels of output signals of the light-emitting elements with the stored adjust output levels; and correcting a color mixture in the step of printing color patterns based on results of the step of comparing levels.

34. The method for forming a multi-color image according to claim 33, wherein the color patterns include patches of yellow, magenta, cyan and black and the step of reading the printed color patterns reads the yellow patch first.

35. The method for forming a multi-color image according to claim 34, wherein the plurality of light-emitting elements includes light emitting elements for blue, green and red light, and if the comparing step determines that an output signal of the green light emitting element is decreased, an intensity of printing the magenta color pattern is decreased.

36. The method for forming a multi-color image according to claim 34, wherein the plurality of light-emitting elements includes light emitting elements for blue, green and red light, and if the comparing step determines that an output signal of the red light emitting element is decreased, an intensity of printing the cyan color pattern is decreased.

37. The method for forming a multi-color image according to claim 34, wherein the plurality of light-emitting elements includes light emitting elements for blue, green and red light, and if the comparing step determines that an output signal of the blue light emitting element is decreased, an intensity of printing the yellow color pattern is decreased.

* * * * *